(12) United States Patent
Tanaka et al.

(10) Patent No.: US 8,506,012 B2
(45) Date of Patent: Aug. 13, 2013

(54) CENTER-FOLDABLE SEAT BACK, SEAT WITH THE SAME, AND METHOD OF MANUFACTURING CENTER-FOLDABLE SEAT BACK

(75) Inventors: Mutsumi Tanaka, Tochigi (JP); Katsuhiko Shinozaki, Tochigi (JP); Fumitaka Tsuji, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 457 days.

(21) Appl. No.: 12/746,975

(22) PCT Filed: Dec. 12, 2008

(86) PCT No.: PCT/JP2008/072712
§ 371 (c)(1), (2), (4) Date: Jun. 9, 2010

(87) PCT Pub. No.: WO2009/075365
PCT Pub. Date: Jun. 18, 2009

(65) Prior Publication Data
US 2010/0270840 A1 Oct. 28, 2010

(30) Foreign Application Priority Data
Dec. 12, 2007 (JP) ................................. 2007-320720

(51) Int. Cl.
*A47C 27/00* (2006.01)
(52) U.S. Cl.
USPC ............... 297/218.1; 297/228.13; 297/452.62
(58) Field of Classification Search
USPC ................. 297/218.1–218.5, 228.13, 354.11, 297/452.58, 452.59, 452.6
See application file for complete search history.

(56) References Cited

U.S. PATENT DOCUMENTS

| | | | | |
|---|---|---|---|---|
| 4,047,756 A | * | 9/1977 | Ney | 297/219.1 |
| 5,058,953 A | * | 10/1991 | Takagi et al. | 297/284.4 |
| 6,079,779 A | * | 6/2000 | Tanaka et al. | 297/228.13 |
| 7,255,405 B2 | * | 8/2007 | Kodera et al. | 297/452.62 |
| 7,673,939 B2 | * | 3/2010 | Taguchi et al. | 297/218.1 |
| 8,061,780 B2 | * | 11/2011 | Tsuji et al. | 297/452.58 |

FOREIGN PATENT DOCUMENTS

| | | |
|---|---|---|
| JP | 05-76359 U | 10/1993 |
| JP | 2001-180343 A | 7/2001 |
| JP | 2001-197956 A | 7/2001 |
| JP | 2001-199266 A | 7/2001 |
| JP | 2008-125870 A | 6/2008 |

* cited by examiner

*Primary Examiner* — David Dunn
*Assistant Examiner* — Richard Lowry
(74) *Attorney, Agent, or Firm* — Drinker Biddle & Reath LLP

(57) ABSTRACT

A center-foldable seat back has a seat back upper part that can be tilted forward relative to a seat back lower part. A trim cover is provided, sewn along the entire periphery at the mutual contact position of an upper and lower cover, the pulled-in state is modulated by cloth pieces, thereby preventing wrinkles. The seat back is provided with the trim cover in which one cloth piece one side edge of which is sewn to the ends of the lower and upper cover is provided at least in the central portion on the inside of the trim cover, the cloth piece is extended inward, the other side edge thereof is sewn to a fastener, the central portion on the back side is extended inward and sewn to the fastener, and the central portion on the inside of the trim cover is sewn to open and close by one fastener.

15 Claims, 40 Drawing Sheets

CENTER-FOLDABLE SEAT BACK, SEAT WITH THE SAME, AND METHOD OF MANUFACTURING CENTER-FOLDABLE SEAT BACK

CROSS REFERENCE TO RELATED APPLICATIONS

This application is the U.S. national phase of the International Patent Application No. PCT/JP2008/072712 filed Dec. 12, 2008, which claims the benefit of Japanese Patent Application No. 2007-320720 filed Dec. 12, 2007, the entire content of which is incorporated herein by reference.

BACKGROUND

The present invention relates to a center-foldable seat back, a seat provided with the center-foldable seat back, and a method of manufacturing the center-foldable seat back. More particularly, it relates to a center-foldable seat back in which a seat back upper part of the seat back can be tilted forward relative to a seat back lower part, a vehicle seat provided with the center-foldable seat back, and a method of manufacturing the center-foldable seat back.

A center-foldable seat back is a design with an associated technique enabling a seat back upper part to tilt forward relative to a seat back lower part, and various types of designs and associated techniques for the center-foldable seat back have conventionally been proposed.

Since the center-foldable seat back is configured so that the seat back upper part can be tilted forward relative to the seat back lower part, various designs have been made in covering the seat back upper part and the seat back lower part with a trim cover.

For example, as the trim cover, a technique has been known in which the seat back upper part is covered with an upper cover, the seat back lower part is covered with a lower cover, and the upper cover and the lower cover are sewn together along the entire periphery so that no gap is provided between the seat back upper part and the seat back lower part. According to this technique, the seat back can be configured so that the internal structure of the seat back is not exposed to the outside due to the trim cover, and no gap is provided between the seat back upper part and the seat back lower part.

For the center-foldable seat back provided with the trim cover in which the upper cover and the lower cover are sewn together along the entire periphery, a technique has been proposed in which the trim cover is provided with a tension cloth by being extended inward from the upper cover and the lower cover of the trim cover to modulate the pulled-in state and to prevent wrinkles from occurring on the seat surface side of trim cover when the upper frame tilts.

For example, a technique has been proposed in which a plurality of tension cloths folded double in a bag shape are sewn together to the peripheral ends of the upper cover and the lower cover of the trim cover with an appropriate space being provided therebetween, an extensible member such as a rubber string is inserted through the tension cloths, and the ends of the extensible member are fixed to each other by a hook ring, as can be seen in Japanese Unexamined Patent Application Publication No. 2001-180343 ("the '343 Publication") (see paragraph 0024, FIG. 4).

Another technique has been proposed in which a tension cloth in the front and rear direction is provided to extend inward from the ends of a central portion excluding the right and left portions on the inside of the trim cover as side frame insertion parts, the rear side edge and the front side edge of tension cloth are fixed to each other by a hook ring, and a wire supporting the tension cloth is provided to project downward from an upper frame so that the pressing force can be changed in an erected state or a tilted state of the upper frame, as is seen in Japanese Unexamined Patent Application Publication No. 2001-197956 ("the '956 Publication").

As still another proposed technique, a technique has also been proposed in which a band-like rubber string provided with a resin hook at the front side edge thereof is provided in the back-side central portion, a tension cloth is provided in the front-side central portion, the rubber string is locked to a wire projecting downward from an upper frame by the resin hook to pull the back-side central portion, and the front-side tension cloth is fixed to a back-side joint flap and is pulled, as is seen in Japanese Unexamined Patent Application Publication No. 2001-199266 ("the '266 Publication").

For the above-described center-foldable seat back, it is anticipated that the pulled-in state is modulated by the tension cloth, and wrinkles are prevented from occurring on the seat surface side of the trim cover.

All of the above-described proposed techniques have a disadvantage that the construction is complicated, so that much time and labor are required for putting the trim cover including the assembling of tension cloth and other members, thereby lowering the work efficiency. That is, in addition to the work for putting the trim cover, the hook ring and the like must be installed in a covered state, so that it is necessary to perform work in a very tight space, which presents a disadvantage that not only the worker requires high skill but also the work efficiency is low.

Also, in the above-described proposed techniques, the trim cover must be put between the upper frame and the lower frame, and further work for applying tension to the tension cloth by another member must be performed. Therefore, improvement has not been made on a point on which the trim cover is put considering the upper frame and the lower frame.

SUMMARY

An object of various embodiments of the present invention is to provide a seat comprising a center-foldable seat back in which a seat back upper part can be tilted forward relative to a seat back lower part, wherein when an upper pad and a lower pad are covered with a trim cover sewn along the entire periphery at the mutual contact position of an upper cover and a lower cover, the pulled-in state can be modulated, wrinkles can be prevented from occurring on the seat surface side of the trim cover, the trim cover itself can be assembled easily, the work efficiency is high, and the appearance of all of the seat can be kept good, a vehicle seat provided with the center-foldable seat back, and a method of manufacturing the center-foldable seat back.

Another object is to provide a seat comprising a center-foldable seat back in which even if the design is made so that upper and lower frames of the seat back keep their strength, the workability of work for covering an upper pad and a lower pad with a trim cover sewn along the entire periphery at the mutual contact position of an upper cover and a lower cover can be improved, and the efficiency thereof can be enhanced, a vehicle seat provided with the center-foldable seat back, and a method of manufacturing the center-foldable seat back.

To achieve the above objects, various embodiments of the present invention provide a seat comprising a center-foldable seat back in which a seat back upper part can be tilted forward relative to a seat back lower part, the seat back comprising a back frame comprising an upper frame supporting the seat back upper part and a lower frame supporting the seat back lower part, the upper frame being tiltably connected to the lower frame; an upper pad assembled to the upper frame and a lower pad assembled to the lower frame; and a trim cover for covering the upper pad and the lower pad, wherein the trim cover is sewn along the entire periphery at a mutual contact position of an upper cover and a lower cover, and is openable and closable by a connecting member comprising a first connecting part disposed at a sewing position of a front cover and a second connecting part disposed at a sewing position of a rear cover.

By sewing the mutual contact positions of the upper cover and the lower cover along the entire periphery as described above, the internal structure of the seat back cannot be seen from the outside, and foreign matters can be prevented from entering deep between the seat back upper part and the seat back lower part. Therefore, a hindrance to the tilting caused by foreign matters can be eliminated, and at the same time, the appearance as all of the vehicle seat can also be kept good.

Also, by making the configuration such that the trim cover can be opened and closed by the connecting member comprising the first connecting part disposed at the sewing position of the front cover and the second connecting part disposed at the sewing position of the rear cover, since the openable and closable connecting member is used, the upper pad can be covered with the upper cover merely by closing the connecting member after the upper pad is covered with the upper cover. Therefore, the assembling work is easy to do, and the work efficiency is enhanced. That is, the trim cover can be placed easily by simple work such that after the upper pad has been assembled to the upper frame and the lower cover has been reversingly rolled up from the open side to keep a state in which the connecting member is open, all of the frame to which the upper pad is assembled is inserted into the upper cover and the upper cover is placed on the upper pad, and next, after the connecting member has been closed to close the upper cover, the lower pad is assembled to the lower frame and the lower cover is rolled down to finally close the open side of the lower cover.

Also, by closing the connecting member, the sewing portion of the upper cover and the lower cover is pulled to the inside of the seat back, so that a pulling-in effect is produced, and the seat back upper part and the seat back lower part each has a sharp shape like a separate body. Therefore, the occurrence of wrinkles can be prevented.

It is preferable that a cloth piece be interposed between the sewing portion of the upper cover and the lower cover located on a front side of the seat back of the trim cover and the first connecting part or between the sewing portion of the upper cover and the lower cover located on a rear side of the seat back and the second connecting part.

If the cloth piece is interposed in this manner, the positions of the connecting members can be adjusted, and the connecting member can be assembled at a position that is optimum considering the work and the pulling-in effect based on the relationship with the upper and lower frames and the upper and lower pads.

Also, it is preferable that the cloth piece be disposed in a central portion on the inside of the trim cover. By disposing the cloth piece in the central portion in this manner, the opening and closing work for the connecting member is easy to do, and a portion between the seat back upper part and the seat back lower part can be formed to be pulled-in deeply.

It is preferable that the connecting member be any one of a slide fastener, a Delrin fastener, an open slide fastener, a snap faster, and a hook-and-eye. Thus, the connecting member can use various types of members. In particular, it is preferable that the connecting member be any one of a slide fastener, a Delrin fastener, and an open slide fastener, and only one stripe of connecting member be used.

Thus, especially in the case where the slide fastener is used, only one stripe of connecting member has only to be provided, so that the number of parts can be reduced, and the assembling can be performed by opening and closing the connecting member by sliding in a right and left direction. Therefore, the connection in the front and rear direction between the seat back upper part and the seat back lower part of the trim cover can be made reliable. Further, since the operation is merely a sliding one, the work efficiency can be enhanced even in a very tight work space between the seat back upper part and the seat back lower part. In the case where the open slide fastener is used, an endmost locking piece of the connecting member slips off, and the connecting member separates to the right and left, so that the assembling work is very easy.

Also, it is preferable that the connecting member be attached so that the center thereof is located on the back surface side of a vertical line connecting the upper frame to the lower frame.

Generally, the back frame of the seat back that is not of a center-foldable type consists of one frame, whereas the center-foldable seat back is divided into two, the upper frame supporting the seat back upper part and the lower frame supporting the seat back lower part, to tilt the upper frame. These frames (pipes) are present above, below, or at the rear (back surface) side of the connecting member for connecting the sewing portions at the front and rear of the upper cover and the lower cover, which may become a hindrance to the work efficiency of the opening and closing work for the connecting member.

For the center-foldable seat back, to keep the strength of the back frame, the upper frame, which is on a tilt side, is preferably made large. However, since the size of the seat back is restricted, if the upper frame is made large, the distance between the upper frame and the lower frame decreases. That is, as described above, when the trim cover is placed, the frame (pipe) that is present above, below, or at the rear of the connecting member becomes a hindrance, which presents a disadvantage that the opening and closing work for the connecting member requires much time and labor, and the workability at the time when the trim cover is placed is poor.

Accordingly, by locating a center of the connecting member on the back surface side of a vertical line connecting the upper frame to the lower frame, the connecting member is located at a rear position of the upper frame and the lower frame at which the assembly is easy to do. Therefore, the workability of the work performed from the rear can be improved.

Further, it is preferable that assembling be performed so that a vertical extension line of one frame of the upper frame and the lower frame, a vertical extension of the central portion of the connecting member, and a vertical extension line of the other frame of the upper frame and the lower frame do not coincide with each other.

Since the configuration is made such that the vertical extension line of the upper frame, the vertical extension line of the lower frame, and the vertical extension of the central portion of the connecting member do not coincide with each other. Therefore, the lower frame and the upper frame are assembled so as not to coincide with and not to overlap on the connecting member in the front and rear direction, the assembly is easy to do.

At this time, the lower frame of the connecting member (fastener or clip) connecting the upper and lower covers to each other can also be arranged at a front of the upper frame (the lower frame lies at the front). In this case, the work space is secured on the lower side, so that the workability of the work performed from the rear can be improved. In particular, since the opening and closing work for the connecting member can be performed in a state in which the upper frame is tilted forward, the work space on the upper side is further secured, and the workability of the work performed from the rear is improved.

In such a case, even if the positions in the front and rear direction of the upper frame and the lower frame change, these frames can be covered with the trim cover using the same connecting member.

Further, it is preferable that a contact preventing element be provided between the upper and lower frames and the connecting member.

Since the center-foldable seat back is generally manufactured by being divided as described above, the strength of the center-folding portion must be kept. Therefore, a space between the upper frame and the lower frame must be decreased. However, if the space between the upper and lower frames is decreased, when the connecting member comes into contact with the upper frame or the lower frame, an abnormal sound may be produced, or the connecting member may be damaged. If the contact preventing element is provided between the upper and lower frames and the connecting member, the contact of the connecting member with the reinforcing frame can be restrained so that the production of abnormal sound can be prevented.

As the contact preventing element, a cushion member (contact restraining member) can be provided between the connecting member and the upper frame. As this cushion member, the upper pad or the lower pad can be used. By doing this, the contact of the connecting member with the upper frame or the lower frame can be restrained so that the production of abnormal sound can be suppressed.

As a specific contact preventing element, the pad is extended from the front side of the seat back toward the rear to be interposed between the connecting member and the upper frame or the lower frame. Thereby, the contact of the connecting member with the frame can be restrained, so that the production of abnormal sound can be suppressed.

As another specific contact preventing element, the pad is provided to cover the upper frame or the lower frame with the pad. If the frame is covered with the pad in this manner, the positional shift of the pad or the connecting member caused by vibrations or the like is restrained, so that the production of abnormal sound can be prevented. At this time, the frame need not be covered completely with the pad, and the space between the pads has only to be smaller than the connecting member. Thereby, the connecting member is not brought into contact with the frame, so that the production of abnormal sound can be prevented.

As still another specific contact preventing element, the pad is installed positioned between a welded portion of frame and the connecting member. By doing this as well, the production of abnormal sound caused by the contact of the connecting member with the welded portion can be prevented.

As still another specific contact preventing element, an expanding element for expanding the space between the connecting element and the upper and lower frames can be used. For example, the configuration can be made such that an expanded portion serving as a relief portion is provided on the side on which the upper frame or lower frame faces to the connecting member. In this case, the relief portion in which the upper frame or lower frame faces to the connecting member increases the space so that the work space is secured. Therefore, the workability is improved further.

This relief portion has only to include portions of a start end and a terminal end of the connecting member. Therefore, the relief portion can be formed between the upper frame and the lower frame, or at the side of the upper frame or the lower frame according to a width of the connecting member.

When the upper frame or the lower frame is joined to the side frame or the like at the side position by welding, the joining is performed so that the welded portion becomes wide in width including the welded members. Since the width of the welded portion becomes narrow, as the contact preventing element, the connecting member is provided at a position avoiding the welded portion so that the contact of the connecting member with the welded portion can be prevented.

In the case where the expanding element (expanded portion) for expanding the space between the upper frame and the lower frame is used as the contact preventing element between the connecting member and the upper and lower frames, the connecting member is located between the expanding element, and vertical connecting members are disposed at positions having a width wider than the arrangement width of the connecting member. By adjusting positions of the connecting member and the vertical connecting members in this manner, the contact of the connecting member with the frame is prevented, and the interference of the connecting member with the vertical connecting members is avoided, whereby the workability can be improved.

In the case where the connecting member is provided at a position avoiding the welded portion at the side of the upper frame and the lower frame as the contact preventing element, the vertical connecting members are formed at positions on the outside of the connecting member with the width being further increased. By doing this, the space is increased by the upper frame or the lower frame and the relief portion facing to the connecting member, and also the vertical connecting members do not become a hindrance. Therefore, the work space is secured, and the workability is improved further.

Also, it is preferable that the rotation axis of the upper frame supporting the seat back upper part be arranged below the lower frame supporting the seat back lower part so that the seat back upper part can be tilted forward relative to the seat back lower part.

It is known that the center-foldable seat back generally has a disadvantage that when the seat back upper part is tilted, the clearance and the difference in level of the center-folding portion increase, and therefore the appearance is bad. Accordingly, by arranging a rotation axis of the seat back upper part below the lower frame, vertical movement at the time when the seat back upper part is tilted can be reduced so that a preferred width of the clearance can be maintained.

Also, by forming an extension part formed by extending the front surface lower end part of the upper pad of the seat back upper part downward, at the tilting time, the spread of clearance can be restrained by the extension part so that the appearance is improved.

Further, the lower end surface of the upper pad of the seat back upper part is preferably formed in a shape following the movement path of the seat back upper part, that is, an arcuate shape. By this configuration, the clearance can be made small as far as possible, and an ideal shape such that the clearance does not spread at the time of movement can be realized.

It is preferable that the first connecting part and the second connecting part be arranged at a position in front of the back frame.

In the seat in which the trim cover of the center-foldable seat back is connected by the connecting member, since the pad has a shape such that the front surface part with which the seated person is in contact is thick, the upper frame and the lower frame are generally disposed on the rear side, not in the central portion, in the longitudinal width of the seat back. At this time, if the connecting member is also arranged at the rear like the frames considering the workability at the time of assembling the seat back, when the center-folding mechanism is operated, the cover and the arranged connecting member also move back and forth together. During the repeated operation, the position of the connecting member shifts, and distortion may occur on the cover surface of the upper cover or the lower cover.

According to the above-described configuration, if the connecting member for connecting the upper and lower covers to each other is arranged at the front of the upper and lower frames for connecting the seat back frame, by arranging the connecting member in the central portion in the front and rear direction of the seat, forces are applied to the connecting member evenly from the front and rear direction so that the cover surface of the cover can be prevented from shifting. Also, if the frames are located to the rear, the thickness on the seat cushion side (front direction) of the pad can also be secured.

It is preferable that the connecting member be provided in a location in which the upper pad and the lower pad are not arranged. That is, the upper pad covering the upper frame and the lower pad covering the lower frame are hollow, and a space is formed therein. The connecting member is arranged in this space.

By this configuration, the connecting member is not brought into contact with the upper pad and the lower pad.

It is preferable that a contact preventing element be provided between the upper and lower pads and the connecting member.

For example, if a recess (concave part) is formed, as the contact preventing element, in the upper pad and the lower pad at the position of the connecting member, especially including a range in which the connecting member is moved by the seat back upper part, when the seat back upper part is tilted, the connecting member is less liable to be caught by the pad, and therefore moves smoothly. In particular, if the recess (concave part) is formed in a lower part of the upper pad, the connecting member can be prevented from being caught by the upper pad moving frequently, and smooth movement thereof can be assured.

It is preferable that two assembling connecting members directed to the up and down direction be formed on the back surface of the seat back, and the width of the assembling connecting members be wider than the width of the inner end part of the lower pad.

By this configuration, the lower cover can be rolled up to outside of the lower pad. Therefore, a wider work range can be secured, and also at the time of assembling, the work can be performed with a wider field of vision.

To achieve the above objects, various embodiments of the present invention provide a seat comprising a seat cushion and a seat back provided on the rear side of the seat cushion, wherein the seat back is the center-foldable seat back described below.

The seat provided with the center-foldable seat back in accordance with various embodiments of the present invention can have the features, operation, and effects of the center-foldable seat back described herein.

To achieve the above objects, a method is provided for manufacturing a center-foldable seat back in which a seat back upper part can be tilted forward relative to a seat back lower part, where, of the following Steps 1 to 4, Step 3 and Step 4 are carried out after Step 1 or Step 2:

Step 1: a seat back upper part covering step comprises assembling an upper pad to an upper frame, putting an upper cover of a trim cover on the upper pad, reversingly rolling up a lower cover from the open side to hold a connecting member in an open state, and inserting all of the upper frame to which the upper pad is assembled into the upper cover, Step 2: a tilting step comprises holding the upper frame in a tilted state by being tilted relative to the lower frame, Step 3: a closing step comprises closing the connecting member of the trim cover to close the upper cover, and Step 4: a seat back lower part covering step comprises, after the closing step, disposing all of the lower frame to which a lower pad is assembled on the inside of the lower cover to finally close the open side.

To achieve the above objects, a method is provided for manufacturing a center-foldable seat back in which a seat back upper part tilts forward relative to a seat back lower part, comprising producing, in a back frame producing step, in a back frame, which has an upper frame supporting the seat back upper part and a lower frame supporting the seat back lower part so that the upper frame is tiltably connected to the lower frame; in a trim cover producing step, sewing together an upper cover and a lower cover along the entire periphery at a mutual contact position, disposing a first connecting part at the sewing position of a front cover, and disposing a second connecting part at the sewing position of a rear cover, thereby producing a trim cover to which a connecting member is attached; holding, in a tilting step, the upper frame produced in the back frame producing step in a tilted state by being tilted relative to the lower frame; in a seat back upper part covering step, assembling an upper pad to the upper frame while the upper frame is held in a state of being tilted in the tilting step, and putting the upper cover of the trim cover on the upper pad; then, reversibly rolling up the lower cover from an open side, and holding the connecting member in an open state; and thereafter, inserting all of the upper frame to which the upper pad is assembled into the upper cover; closing, in a closing step, the connecting member of the trim cover to close the upper cover; and after the closing step, in a seat back lower part covering step, assembling a lower pad to the lower frame, rolling down the lower cover of the trim cover, and disposing all of the lower frame to which the lower pad is assembled on the inside of the lower cover, to finally close the open side.

Because of the above-described configuration, since the upper frame is assembled in a state of being held in a state of being tilted in the tilting step, the region of work for the connecting member becomes large. Therefore, the center-foldable seat back having features of the center-foldable seat back can be manufactured with high efficiency.

Accordingly, by sewing the mutual contact positions of the upper cover and the lower cover along the entire periphery, the internal structure of the seat back cannot be seen from the outside, and foreign matter can be prevented from entering deep between the seat back upper part and the seat back lower part. Therefore, a hindrance to the tilting caused by foreign matter can be eliminated, and, at the same time, the appearance as all of the vehicle seat can also be kept good.

Also, because of the configuration such that opening and closing can be performed by the connecting member comprising the first connecting part disposed at the sewing position of the front cover and the second connecting part disposed at the sewing position of the rear cover, since the openable and closable connecting member is used, the upper pad can be covered with the upper cover merely by closing the connecting member after the upper cover has been put on the upper pad. Therefore, the assembling work is made easy, and the work efficiency is enhanced.

BRIEF DESCRIPTION OF THE DRAWINGS

The invention is described in more detail below with reference to various embodiments illustrated in the drawings and associated descriptive portions.

DETAILED DESCRIPTION OF THE EMBODIMENTS

One embodiment of the present invention will now be described with reference to the accompanying drawings. The members, arrangements, and the like described below do not restrict the present invention, and various changes and modifications can be made within the scope of teachings of the present invention.

Figure 1:
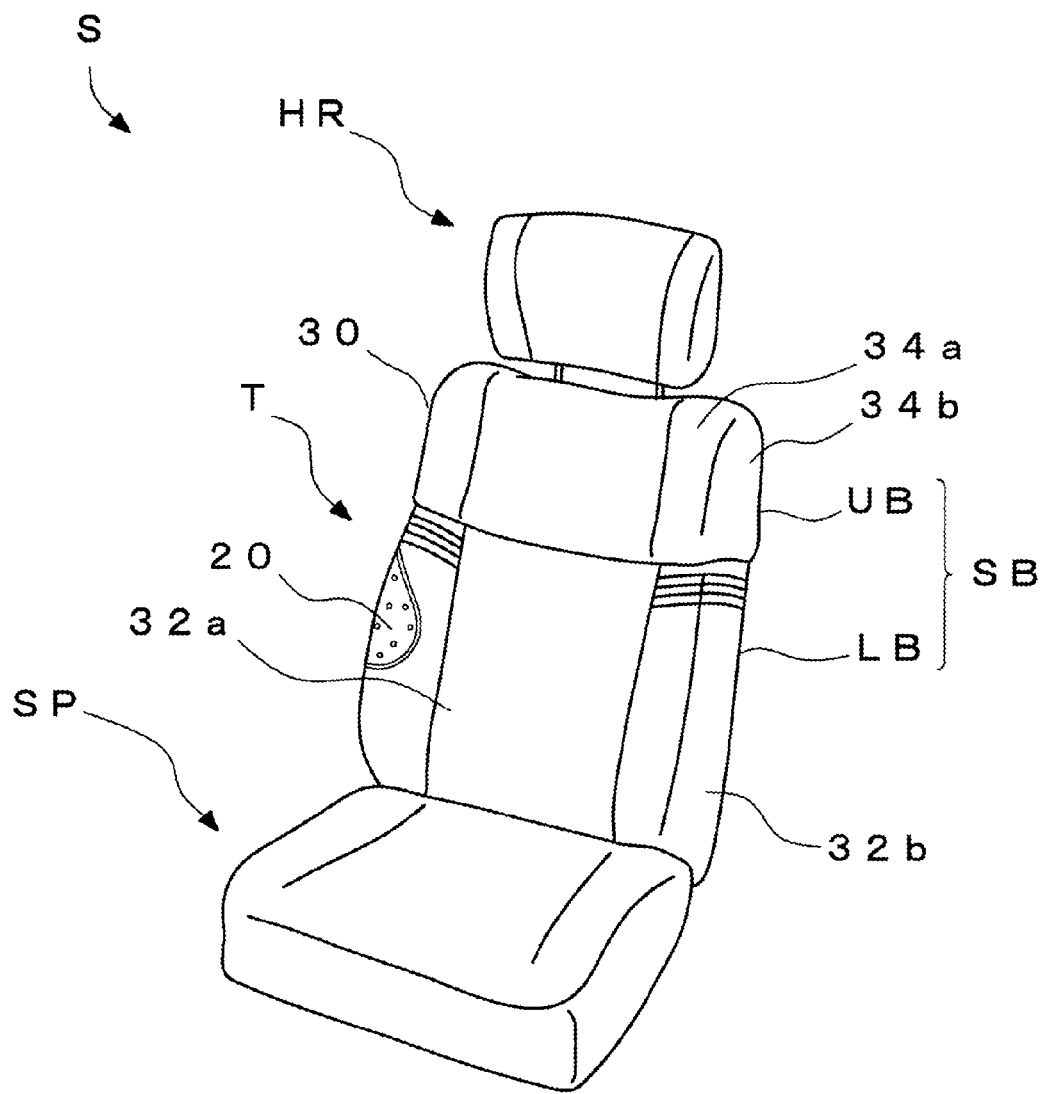
FIG. 1 is a schematic perspective view of a vehicle seat provided with a center-foldable seat back.

As shown in FIG. 1, a vehicle seat S of this embodiment includes a seat cushion SP, a center-foldable seat back SB, and a headrest HR. The center-foldable seat back SB is configured so that a seat back upper part UB can be tilted forward relative to a seat back lower part LB, and at the sides on the front surface of the center-foldable seat back SB, regular rugged stripes T are formed. By these rugged stripes T, at the center-folding time, orderly contraction can be accomplished, and at the erecting time, regular restoration can be accomplished. Therefore, wrinkles can be prevented from occurring fixedly so that the appearance can be improved.

The center-foldable seat back SB includes a back frame 10, a pad 20, and a trim cover 30. The back frame 10 includes, as principal elements, side frames 12, connecting frames 14, a lower frame 16, and an upper frame 18.

The side frame 12 is formed with a hinge arm at the lower end on one side thereof, and is fixedly mounted with an arm for a reclining device on the lower side on the other side thereof (both the hinge arm and the arm are not shown).

The connecting frame 14, which forms a part of center-folding, is interposed between the lower frame 16 and the upper frame 18. The lower frame 16 is fixed to the side frames 12, and the connecting frames 14 are disposed at the upper positions of the lower frame 16. Also, between the connecting frame 14 and the lower frame 16, a reinforcing plate 16*a* is fixed to the connecting frame 14 and the lower frame 16 by welding to reinforce this portion.

The upper frame 18 of this embodiment has a U shape. The upper frame 18 is provided with an upper part 18*b* to which guides 18*d* for headrest pillars (not shown) are fixed in an intermediate area between both sides of the U-shaped upper frame 18 and an intermediate part 18*a* transversely set on the both sides of U-shaped upper frame 18, and the lower parts on the both sides of the U-shaped upper frame 18 are connected to the side frames 12. Both the end sides of the intermediate part 18a are fixed to the connecting frames 14 and side parts 18c of the U-shaped upper frame 18.

Figure 3:
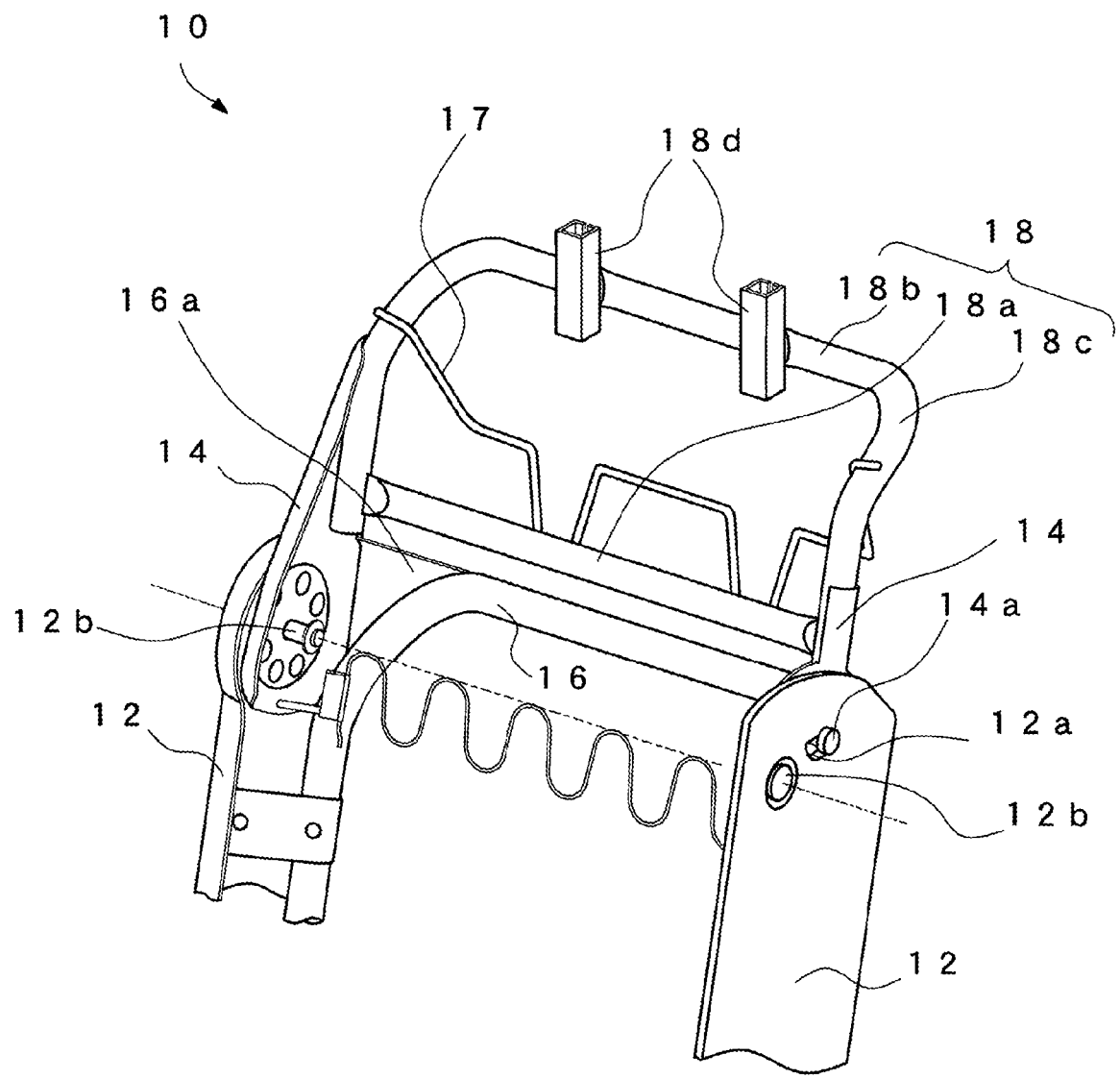
FIG. 3 is a perspective schematic explanatory view of a frame used for a center-foldable seat back.
Figure 4:
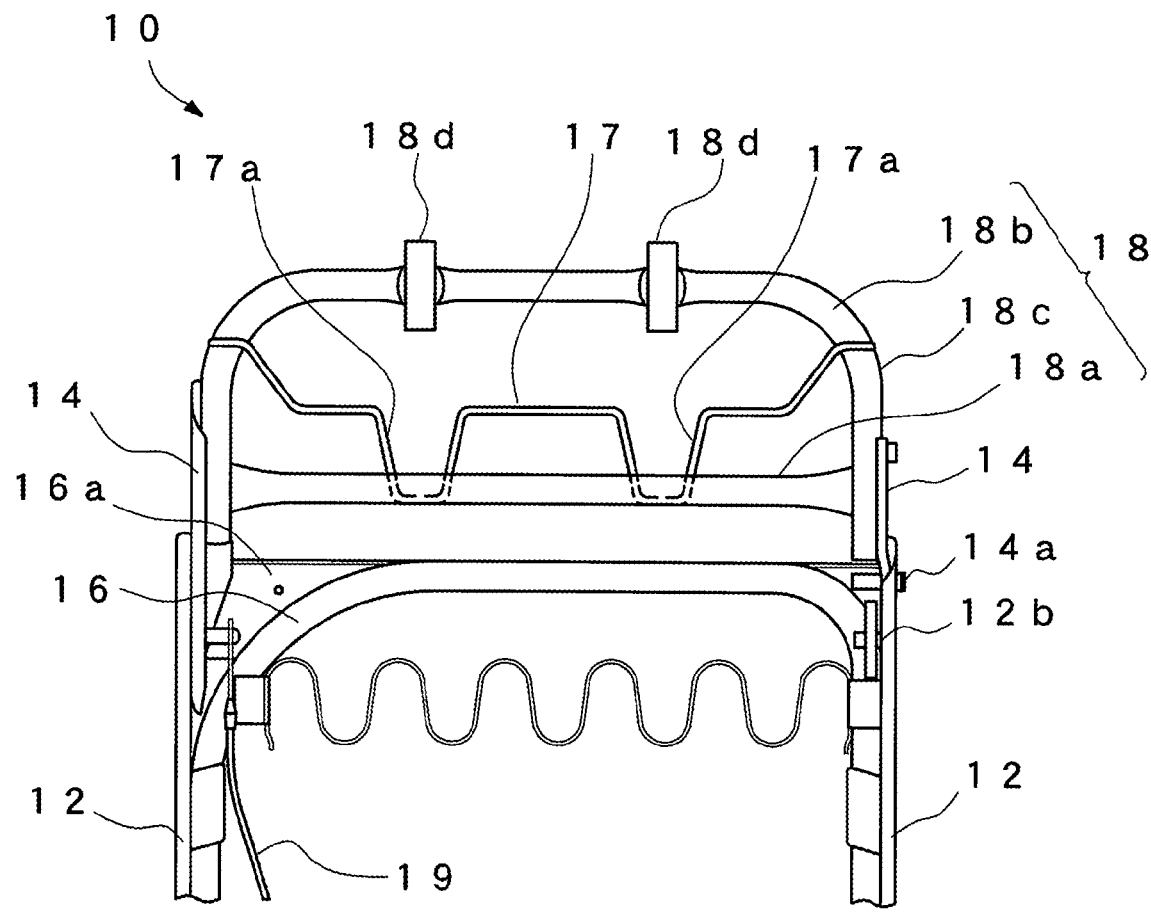
FIG. 4 is a front explanatory view of the front side of FIG. 3.
Figure 5:
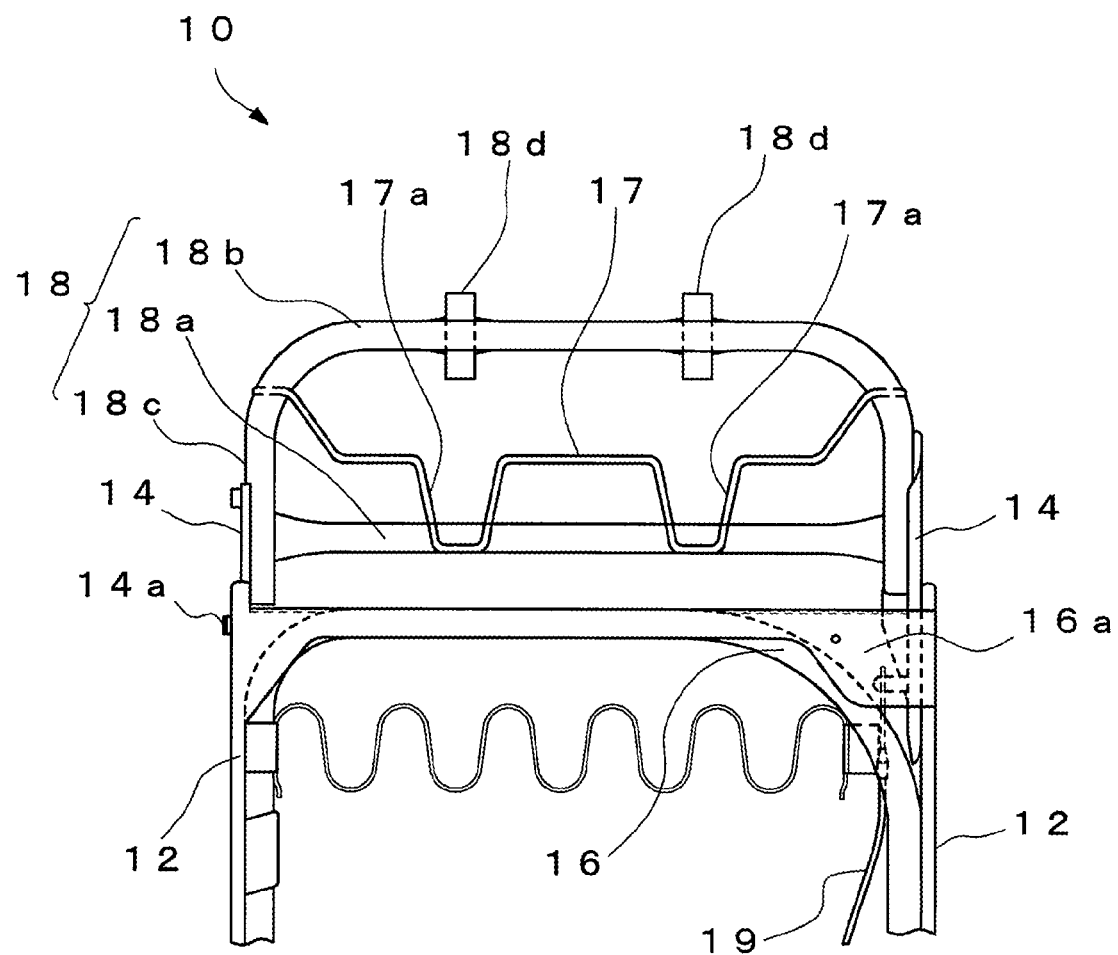
FIG. 5 is a rear explanatory view of the back surface side of FIG. 3.

As shown in FIG. 3, the lower side part of the connecting frame 14 is pivotally supported on the side frame 12 by a shaft part 12b to be rotatable, and the upper frame 18 is attached to the connecting frames 14 to be tiltable in the front and rear direction, so that the seat back upper part UB can be tilted forward relative to the seat back lower part LB.

As shown in FIG. 3, the side frame 12 is formed with an arcuate groove 12a having an arc shape with the shaft part 12b being the center, and the connecting frame 14 is fixedly provided with a guide protrusion 14a inserted in the arcuate groove 12a, so that the configuration is made such that the rotating of the upper frame 18 is regulated by both ends of the arcuate groove 12a.

Reference numeral 17 denotes a surrounding wire disposed around the headrest pillars and the guides 18d. The surrounding wire 17 is formed with downwardly concave parts 17a. Reference numeral 19 denotes a control cable for controlling the tilt of the upper frame 18. The control cable 19 rotates the connecting frames 14, and rotates the upper frame 18 fixed to the connecting frames 14.

The lower frame 16 and the upper frame 18 are mounted with a lower pad 22 and an upper pad 24, respectively, the lower part of the lower pad 22 and the upper part of the upper pad 24 being formed separately. The lower pad 22 and the upper pad 24 mounted on the lower frame 16 and the upper frame 18, respectively, are covered with the bag-shaped trim cover 30.

The pad 20 of the center-foldable seat back SB of this embodiment is separated into the upper pad 24 and the lower pad 22. The upper pad 24 is assembled to the upper frame 18, and the lower pad 22 is assembled to the lower frame 16.

Figure 6:
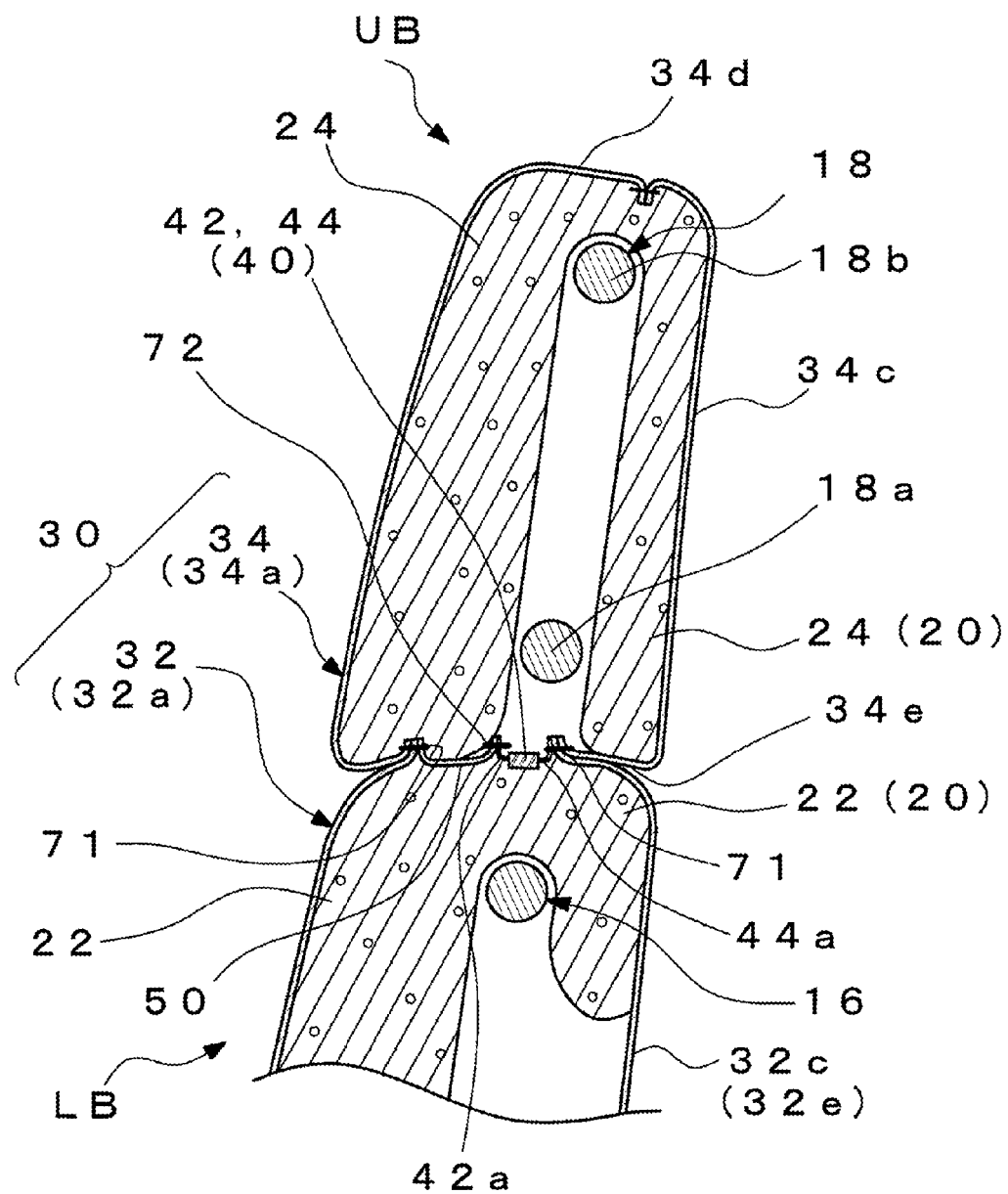
FIG. 6 is an explanatory side sectional view of a relevant portion of a center-foldable seat back.
Figure 7:
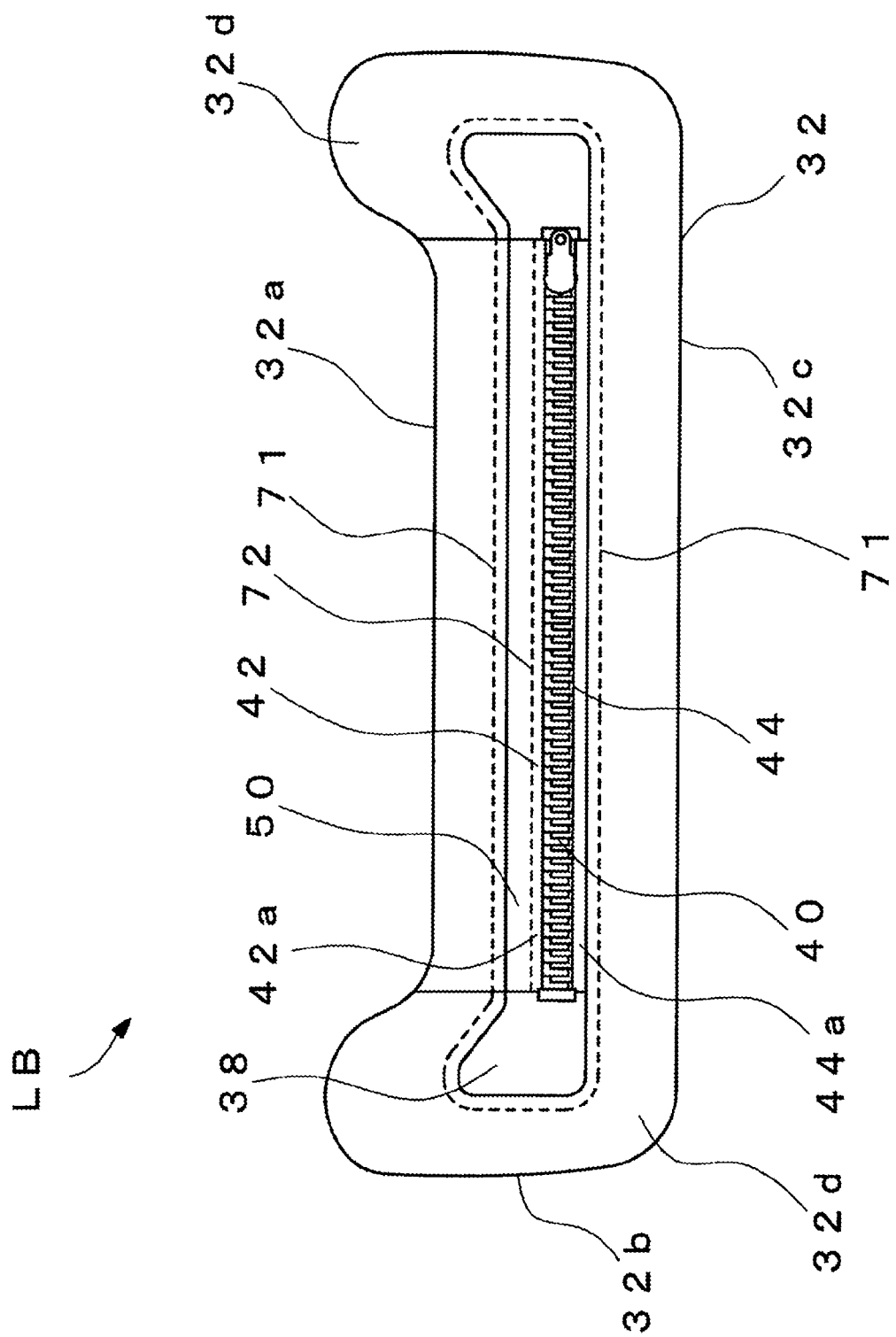
FIG. 7 is a plan view showing the lower cover side of the trim cover shown in FIG. 6.

The trim cover 30 of this embodiment will be explained in more detail with reference to the accompanying drawings. FIG. 6 is an explanatory sectional view of a relevant portion of the center-foldable seat back SB. FIG. 7 is a plan view showing the lower cover 32 side of the trim cover 30 shown in FIG. 6 (in FIG. 7, the illustration of the upper cover 34 is omitted), schematically showing the sewing construction of the trim cover 30. The trim cover 30 shown in the figures is formed of a cloth material such as a fabric, and is sewn into a bag shape by sewing the lower cover 32 covering the lower pad 22 and the upper cover 34 covering the upper pad 24 together.

Figure 2:
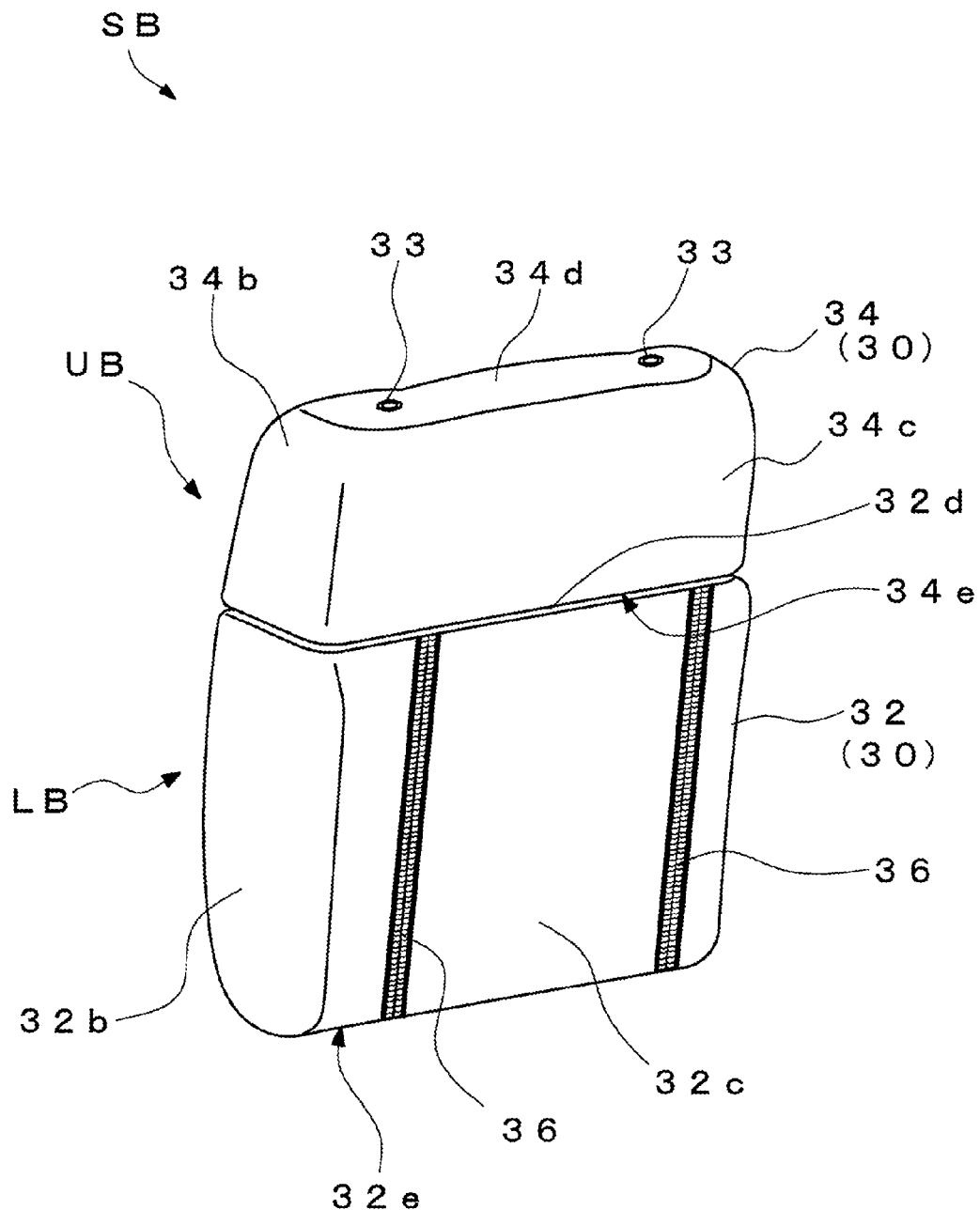
FIG. 2 is a perspective view of the back surface side of a center-foldable seat back.

That is, the trim cover 30 is provided with the upper cover 34 covering the upper pad 24 and the lower cover 32 covering the lower pad 22. The upper cover 34 (that is, the seat back upper part UB side) has a front surface side 34a, side surface sides 34b on both sides, a back surface side 34c, an upper surface side 34d, and a lower surface side 34e, and is sewn into a bag shape as shown in FIGS. 1 and 2. The upper surface side 34d shown in FIG. 2 is formed with mounting holes 33 for mounting the headrest stays. The upper cover 34 is sewn into a bag shape open to the downside to accommodate the upper pad 24 including the upper frame 18.

The lower cover 32 (that is, the seat back lower part LB) has a front surface side 32a, side surface sides 32b on both sides, a back surface side 32c, an upper surface side 32d, and a lower surface side 32e. These surface sides excluding the back surface side 32c and the lower surface side 32e are joined to each other by sewing or the like. The back surface side 32c is separable from the side surface sides 32b, 32b on both sides. This separation is effected by using vertical slide fasteners 36, 36, which are connecting members sliding in the up and down direction, so that the back surface side 32c can be rolled up.

The upper surface side 32d, the front surface side 32a, the side surface sides 32b on both sides, and the back surface side 32c are formed into a bag shape. The lower cover 32 is sewn into a tubular shape open to the upside to accommodate the lower pad 22 including the lower frame 16.

The upper cover 34 and the lower cover 32 are sewn together along the entire periphery at the mutual contact position, and can be opened and closed by a connecting member 40 comprising a first connecting part 42 disposed at the sewing position of the front surface side 32a (front cover) and a second connecting part 44 disposed at the sewing position of the rear surface side 32c.

That is, the lower cover 32 and the upper cover 34 are sewn together by a seam 71 along the entire periphery of the front surface side (seat cushion side) 32a, the right and left side surface sides 32b, and the back surface side 32c.

The lower surface side of the seat back lower part LB may be continuous with the front surface side 32a, or may be wrapped by extending the lower part side of the back surface side 32c and by joining it to the lower part of the front surface side 32a by using a joining member such as a hook-and-hoop fastener.

On the inside of the trim cover 30, a cloth piece 50 is provided in the central portion on the front side, the ends of the lower cover 32 and the upper cover 34 and one edge side of one cloth piece 50 are sewn together by the seam 71 around the entire periphery, the cloth piece 50 is extended inward and the other edge side thereof is sewn by a seam 72 to a front cloth tape 42a provided with one portion of the teeth of the open slide fastener 40 (the teeth and the front cloth tape 42 constitute the first connecting part 42), and the central portions on the back side of the lower cover 32 and the upper cover 34 are extended inward and are sewn by the seam 71 around the entire periphery to a rear cloth tape 44a provided with the other portion of the teeth of the open slide fastener 40, whereby the central portion is sewn to be opened and closed by one open slide fastener 40.

As shown in FIG. 6, the cloth piece 50 is disposed in a substantially central portion on the inside as viewed from the right or left of the trim cover 30. If the trim cover 30 thus configured is provided, by providing the cloth piece 50 in the central portion, the opening and closing work for the connecting member 40 is made easy, and the seat back can be formed so that the seat back upper part UB and the seat back lower part LB are pulled-in deeply. Reference numeral 38 denotes a notch part through which the side frame 12 and the like are inserted.

In this embodiment, since the central portion in the front and rear direction is pulled by one cloth piece 50 and one open slide fastener 40 as shown in FIG. 7, the pulled-in state is modulated by the cloth piece 50, and the occurrence of wrinkles can be prevented by a small number of parts, so that the appearance as all of the vehicle seat S can be kept good. Also, due to the open slide fastener, the lowermost fastener comes off and separates to the right and left, so that the workability is improved.

As the fastener serving as the connecting member 40, in addition to the aforementioned open slide fastener, a slide fastener (zip fastener), a Delrin fastener, a snap fastener, a hook-and-eye, or the like can be used.

By sewing the mutual contact positions of the upper cover 34 and the lower cover 32 along the entire periphery, the internal structure of the seat back SB cannot be seen from the outside, and foreign matters can be prevented from entering deep between the seat back upper part UB and the seat back lower part LB. Therefore, a hindrance to the tilting caused by foreign matters can be eliminated, and at the same time, the appearance as all of the vehicle seat S can also be kept good.

Also, because of the configuration such that opening and closing can be performed by the connecting member 40 comprising the first connecting part 42 disposed at the sewing position of the upper and lower covers 34 and 32 and the second connecting part 44 disposed at the sewing position of the rear covers 34c and 32c, the upper pad 24 can be covered with the upper cover 34 merely by closing the connecting member 40 after the upper cover 34 has been put on the upper pad 24. Therefore, the assembling work is made easy, and the work efficiency is enhanced. That is, the upper pad 24 is assembled to the upper frame 18, and the connecting member 40 is kept in an open state by reversingly rolling up the lower cover 32 from the open side. Then, all of the frame to which the upper pad 24 is assembled is inserted into the upper cover 34, and the upper cover 34 is put on the upper pad 24. Next, after the connecting member 40 is closed to close the upper cover 34, the lower pad 22 is assembled to the lower frame 16, and the lower cover 32 is rolled down, whereby the lower cover 32 can be put easily by simple work without time and labor for finally closing the open side of the lower cover 32.

Since the sewing portion of the upper cover 34 and the lower cover 32 is pulled to the inside of the seat back SB by the closure using the connecting member 40, a pulling-in effect is achieved between the upper cover 34 and the lower cover 32. Also, since the seat back upper part UB and the seat back lower part LB each has a sharp shape like a separate body, the occurrence or wrinkles can be prevented.

Figure 8:
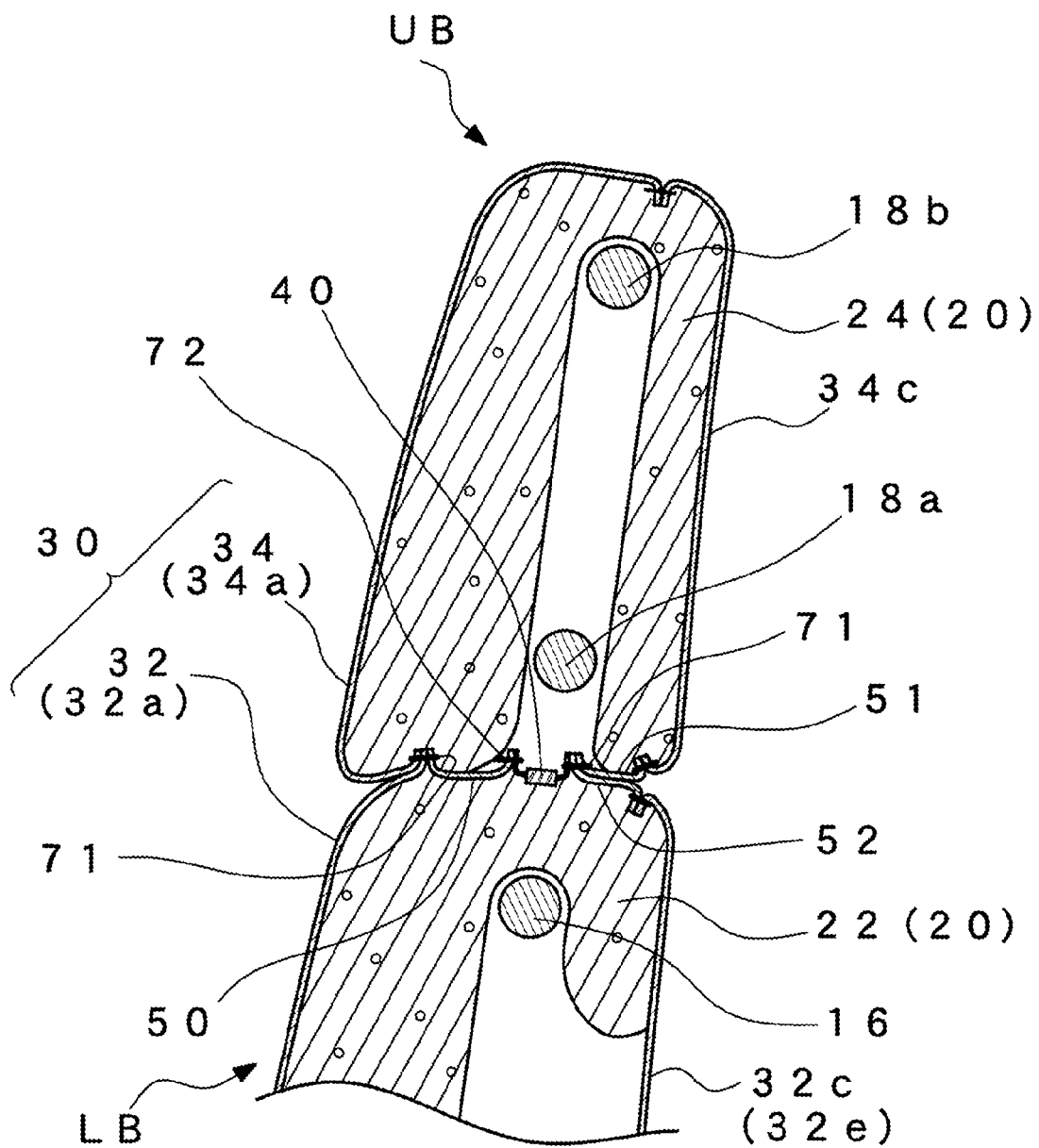
FIG. 8 is an explanatory side sectional view of a relevant portion of a center-foldable seat back.
Figure 9:
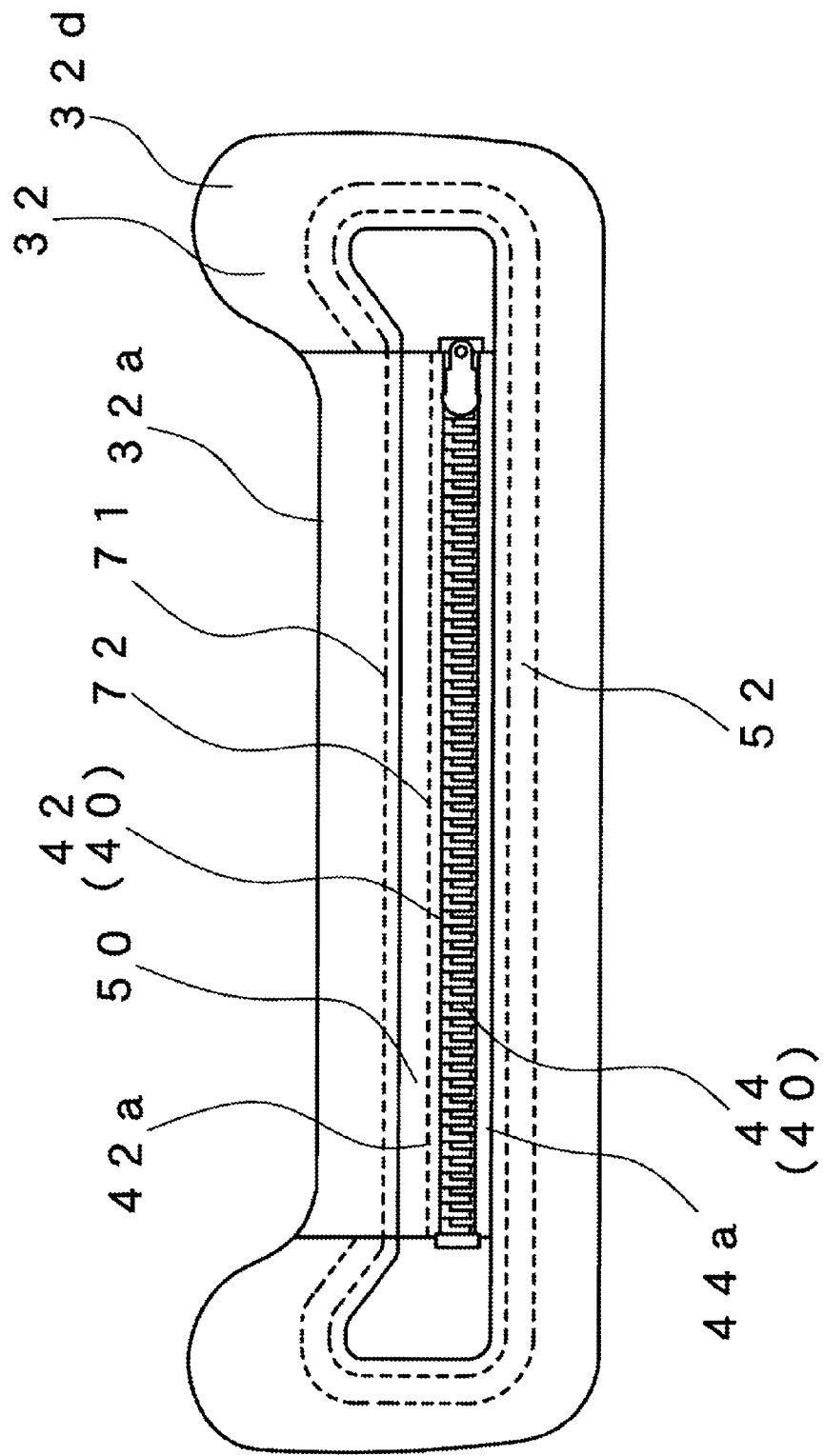
FIG. 9 is a plan view showing the lower cover side of the trim cover shown in FIG. 8.

In the above-described embodiment, one cloth piece 50 is interposed between the sewing portion of the upper cover 34 and lower cover 32, located on the back side of the seat back SB of the trim cover 30, and one connecting part of the first connecting part 42 and the second connecting part 44. However, FIGS. 8 and 9 show another embodiment in which in addition to the sewing construction of the trim cover 30 in accordance with the above-described embodiment, two cloth pieces 50 are provided in the central portion on the back side. In this embodiment, the same letters or numerals are applied to members, arrangements, and the like that are the same as or equivalent to those of the above-described embodiment, and the explanation thereof is omitted.

Cloth pieces 51 and 52 of this embodiment are provided in the central portion on the back side by sewing one edge side thereof by a seam to the ends of the upper surface side 32d of the back surface side 32c of the lower cover 32 and the lower surface side 34e of the back surface side 34c of the upper cover 34, and by sewing the other side edge thereof to the rear cloth tape of the open slide fastener 40 by the seam 71 around the entire periphery.

If the cloth pieces 51 and 52 are interposed as described above, the cloth pieces 51 and 52 serve as a gusset part at the tilting time, so that the seat back SB can be configured so that no unreasonable force is applied to all of the trim cover 30. That is, the occurrence of wrinkles on the trim cover 30 can be prevented more reliably by the cloth pieces 51 and 52. At the same time, with the forward tilting of the seat back upper part UB relative to the seat back lower part LB, the seat back upper part UB opens relative to the seat back lower part LB in the state in which the two cloth pieces 51 and 52 act as a gusset, so that the seat back upper part UB can smoothly be tilted forward relative to the seat back lower part LB.

If the cloth pieces 51 and 52 are interposed as described above, the position of the connecting part can be adjusted, and the connecting member 40 can be assembled to the optimum position considering the work and the pulling-in effect based on the relationship with the upper and lower frames 18 and 16 and the upper and lower pads 24 and 22.

FIGS. 10 to 40 show other embodiments of the present invention. In these embodiments, the same letters or numerals are applied to members, arrangements, and the like that are the same as or equivalent to those of the above-described embodiment, and the explanation thereof is omitted.

Figure 10:
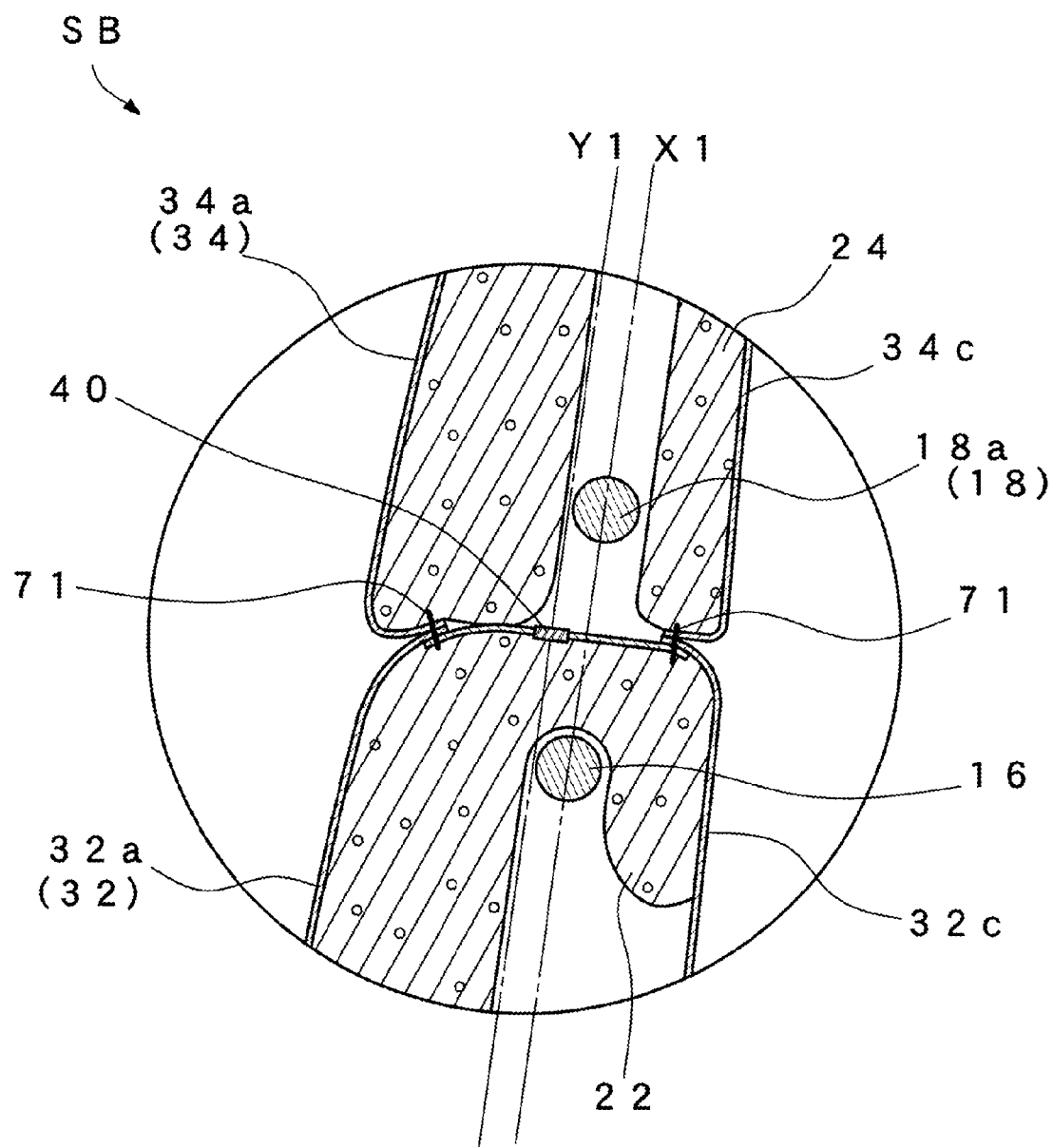
FIG. 10 is an enlarged explanatory side sectional view of a relevant portion of a center-foldable seat back.

The connecting member 40 of the embodiment shown in FIG. 10 is mounted so that the first connecting part 42 and the second connecting part 44, or the center Y1 of the connecting member 40 is located on the front surface side of the seat back SB to be distant from the vertical line X1 connecting the upper frame 18 to the lower frame 16.

In the seat in which the trim cover 30 of the center-foldable seat back SB is connected by the connecting member 40, since the upper and lower pads 24 and 22 each have a shape such that the front surface portion thereof contacting with the seated person is thick, the upper frame 18 and the lower frame 16 are generally disposed on the rear side, not in the central portion, of the width in the front and rear direction of the seat back. If the connecting member 40 is also displaced at the rear like the upper and lower frames 18 and 16, when a center-folding mechanism is operated, the trim cover 30 and the connecting member 40 also move back and forth together. Therefore, after repeated operations, the position of the connecting member 40 shifts, and distortion may occur on the cover surface of the upper cover or the lower cover.

By disposing the connecting member 40 in the central portion in the front and rear direction of the seat, forces are applied to the connecting member 40 evenly from the front and rear direction, so that the trim cover 30 can be prevented from shifting.

Figure 11:
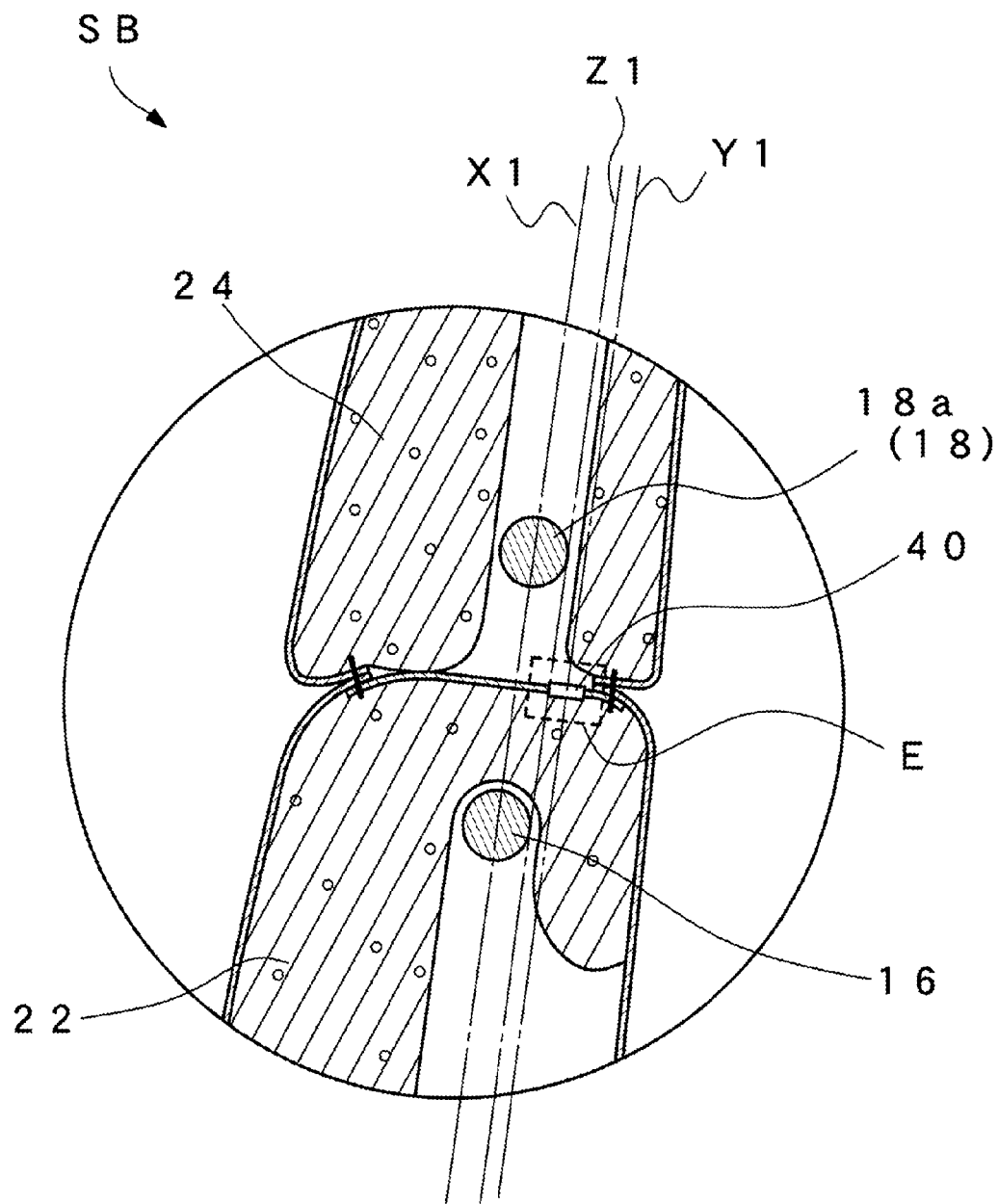
FIG. 11 is an enlarged explanatory side sectional view of a relevant portion of a center-foldable seat back.

As shown in FIG. 11, the connecting member 40 of this embodiment is mounted so that the center Y1 of the connecting member 40 is located on the back surface side of the seat back SB to be distant from the vertical line X1 connecting the upper frame 18 to the lower frame 16.

On the back frame 10, the upper frame 18 supporting the seat back upper part UB and the lower frame 16 supporting the seat back lower part LB are disposed, and these frames are present on the rear (back surface) side of the connecting member 40, so that these frames become a hindrance to work efficiency. However, by locating the center Y1 of the connecting member 40 on the back surface side to be distant from the vertical line X1 connecting the upper frame 18 to the lower frame 16, the connecting member 40, which has been located at a position at which work is difficult to do because it is held between the upper frame 18 and the lower frame 16, is located in the square region E (indicated by the chain line) shown in FIG. 11, and is present at a rear position at which assembly is easy to do. Therefore, the workability for the work performed from the rear can be improved.

In this embodiment, the vertical line X1 is the line connecting the centers of the cross sections of the upper frame 18 and the lower frame 16. However, the vertical line may be a line connecting any positions of the cross sections of the upper frame 18 and the lower frame 16. In the case of the position of the line Z1 in FIG. 11, the front end of the connecting member 40 is arranged at the rear of the rear ends of the upper and lower frames 18 and 16, so that operation can be performed at a position more separated from between the upper and lower frames 18 and 16. Therefore, the workability can be improved further.

Also, in this embodiment, as shown in FIG. 11, since the connecting member is arranged on the front side of the rear end part of the seat cushion, the connecting member can be mounted easily without the increase in size of the seat back SB.

Figure 12:
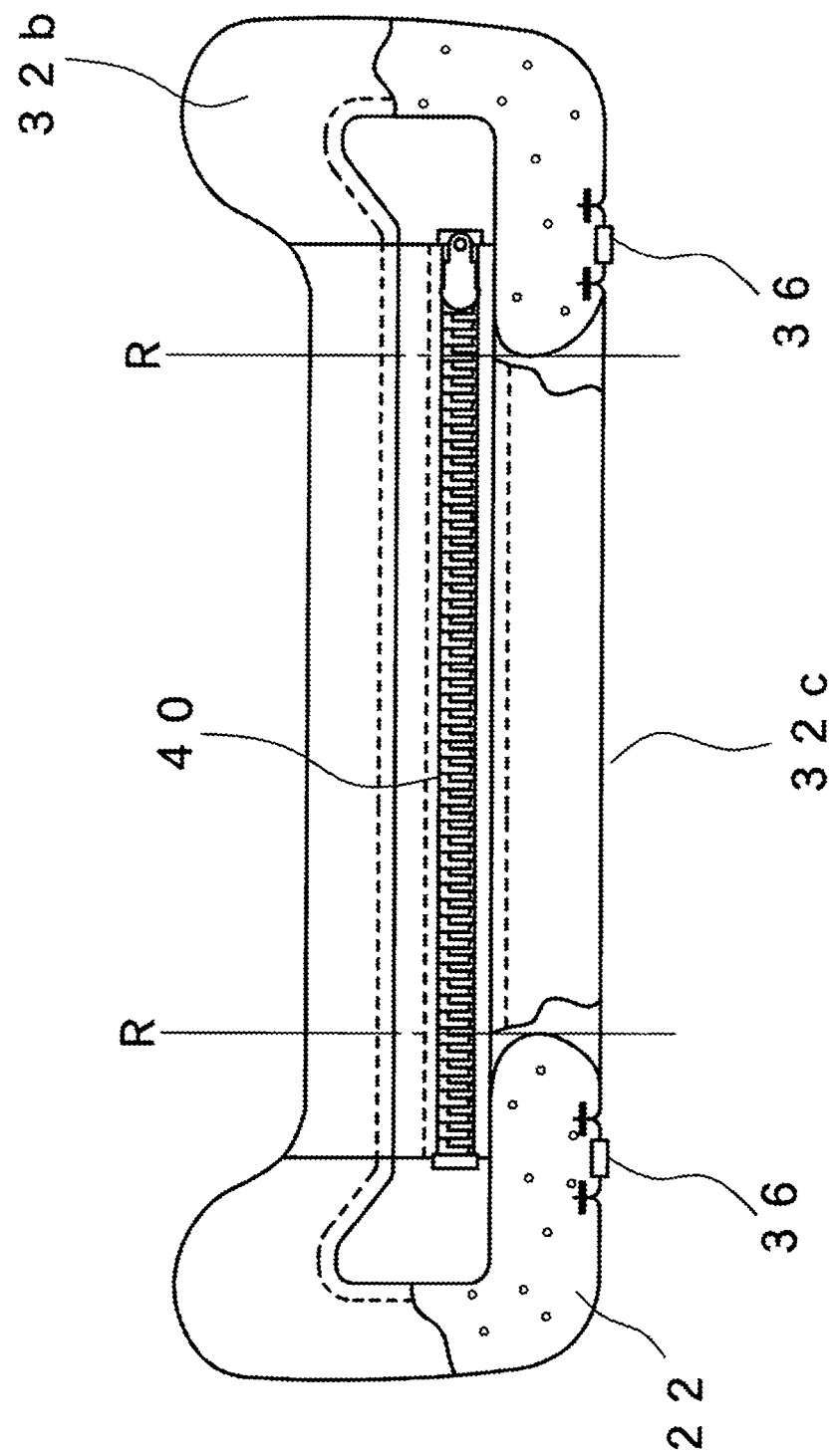
FIG. 12 is a plan view showing the lower cover side of a trim cover of a center-foldable seat back.

Generally, the back surface side of the lower pad 22 is a space part, in which no pad material is disposed, to be usable for other purposes (for example, the storage of magazines). Therefore, as indicated by the lines R in FIG. 12, the pad material, which is placed from the rear, is formed to be arranged to positions close to both sides of the back surface. In this embodiment, the lower cover 32 can be separated at positions between the back surface side 32c and the side surface side 32b by vertical slide fasteners 36, 36, which are connecting members. Also, as shown in FIG. 12, the vertical slide fasteners 36, 36 are attached as two assembling connecting members directed to the up and down direction on the back surface of the seat back SB. By using the vertical slide fasteners 36, 36 in this manner, at the time of assembling, the work can be performed with a wide field of vision.

Also, the start point and the end point of the vertical slide fasteners 36, 36 are arranged on the outside of both ends of the pad 20 with which the upper and lower frames 18 and 16 are covered. When the back surface side of the lower pad 22 is covered with the trim cover 30 in this manner, the end part of the pad 20 can be made in a state of being connected more strongly by the vertical slide fasteners 36, 36, so that sagging caused by the end part of the lower pad 22 can be prevented.

Also, the start point and the end point of the connecting member 40 are arranged on the outside of both ends (lines R in FIG. 12) on the inside of the pad 20 (in FIG. 12, the lower pad 22) with which the upper and lower frames 18 and 16 are covered. When the back surface side of the lower pad 22 is covered with the trim cover 30 in this manner, the trim cover can be put in a state of being connected more strongly by the connecting member 40, so that sagging can be prevented.

Figure 13:
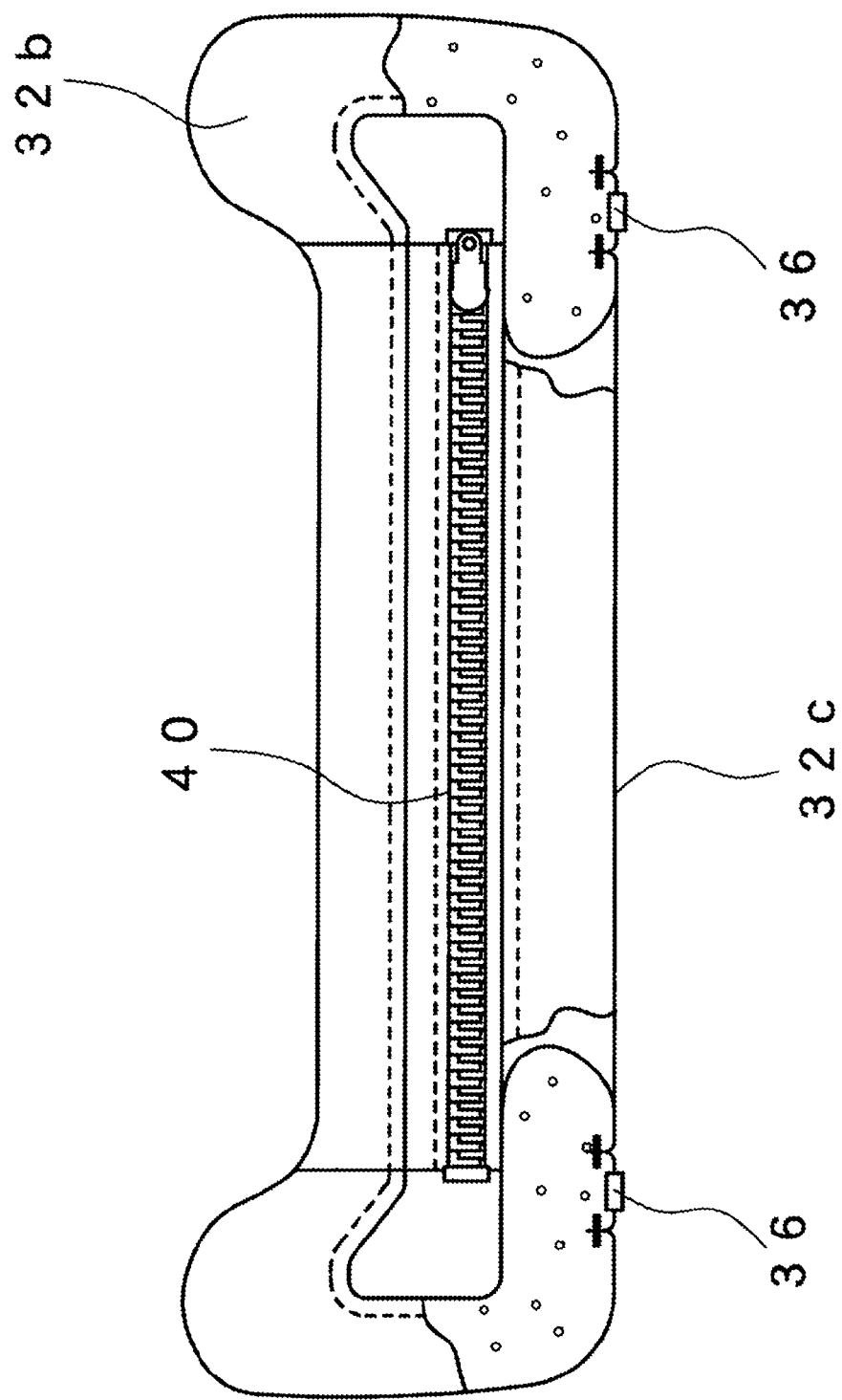
FIG. 13 is a plan view showing the lower cover side of a trim cover of a center-foldable seat back.

Also, the vertical slide fasteners 36, 36 are disposed in the seat back lower part LB to have a space equal to or greater than the width of the connecting member 40 in the relation with the connecting member 40. FIG. 12 shows an embodiment in which the arrangement space of the vertical slide fasteners 36, 36 is equal to the width of the connecting member 40. FIG. 13, which is a figure similar to FIG. 12, shows an embodiment in which the arrangement space between the vertical slide fasteners 36, 36 is greater than the width of the connecting member 40.

According to this embodiment, the configuration is made such that the arrangement space (width) of the two vertical slide fasteners 36, 36 directed to the up and down direction on the back surface of the seat back SB is greater than the width of the inner end part of the cushion covering the side frame 12 from the rear. Therefore, at the time of assembling, the work can be performed with a wider field of vision. Also, the pad 20 part located on the outside is also pulled to the inside, so that the shape becomes sharp.

Figure 14:
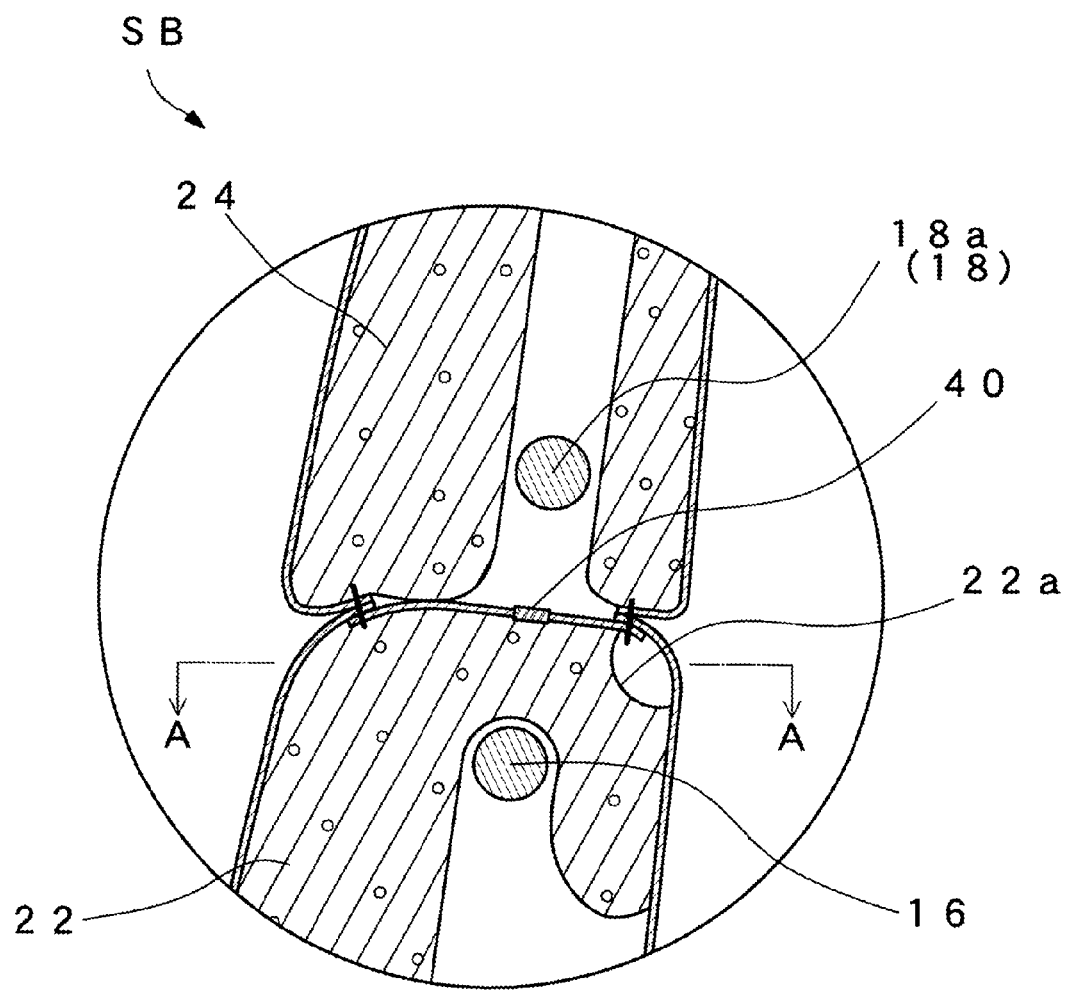
FIG. 14 is an enlarged explanatory side sectional view of a relevant portion of a center-foldable seat back.
Figure 15:
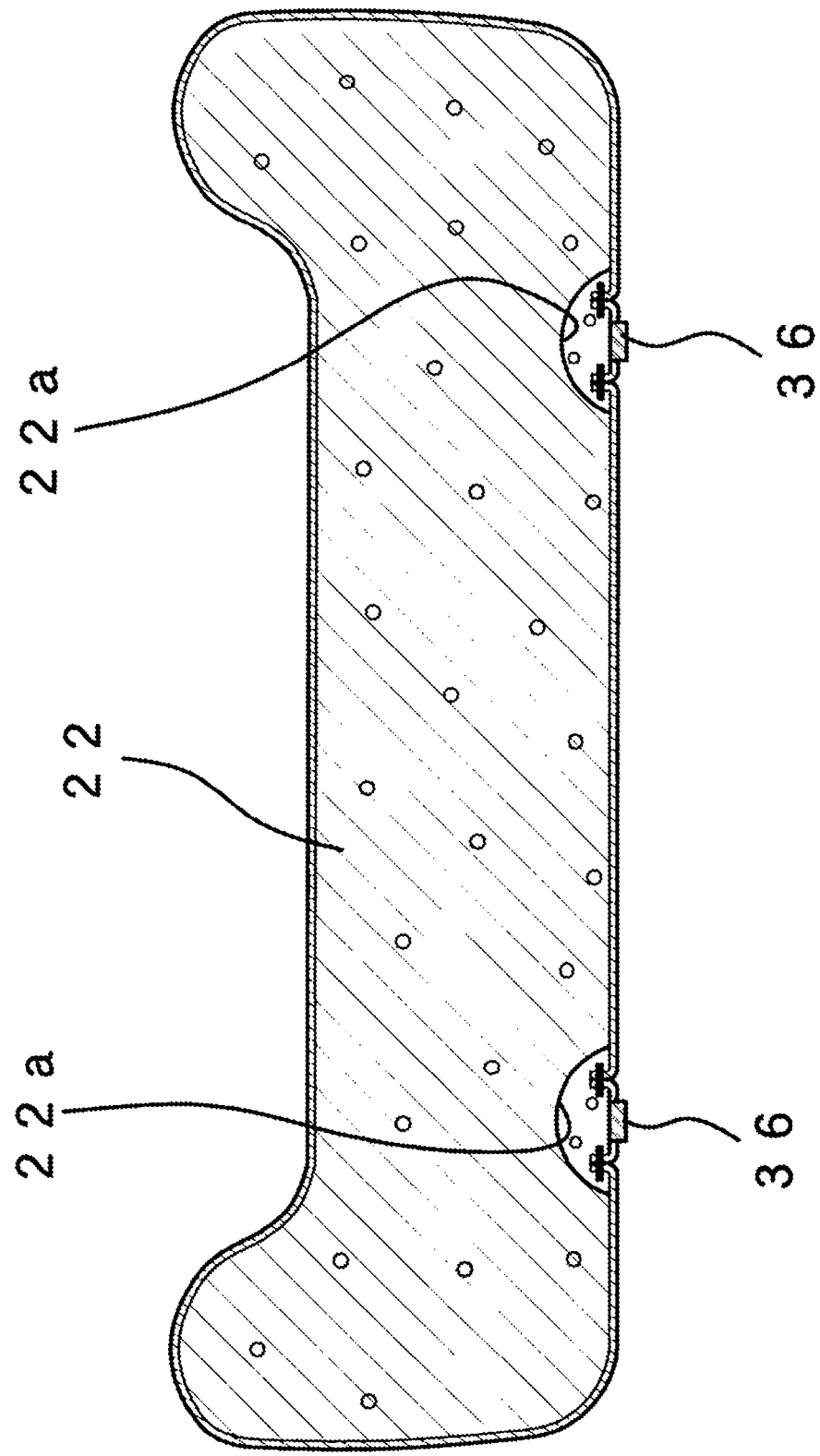
FIG. 15 is an explanatory sectional view of a center-foldable seat back, taken along the line A-A of FIG. 14.

As shown in FIGS. 14 and 15, a portion overlapping on the arrangement position of the vertical slide fastener 36 in an upper part of the lower pad 22 is formed as a notch part 22a. By forming the notch part 22a in this manner, when the vertical slide fastener 36 is located at an upper end position, the interference of the slider of the vertical slide fastener 36 with the pad 20 can be prevented, so that damage to the pad 20 or biting of the slider into the pad 20 can be prevented.

Figure 16:
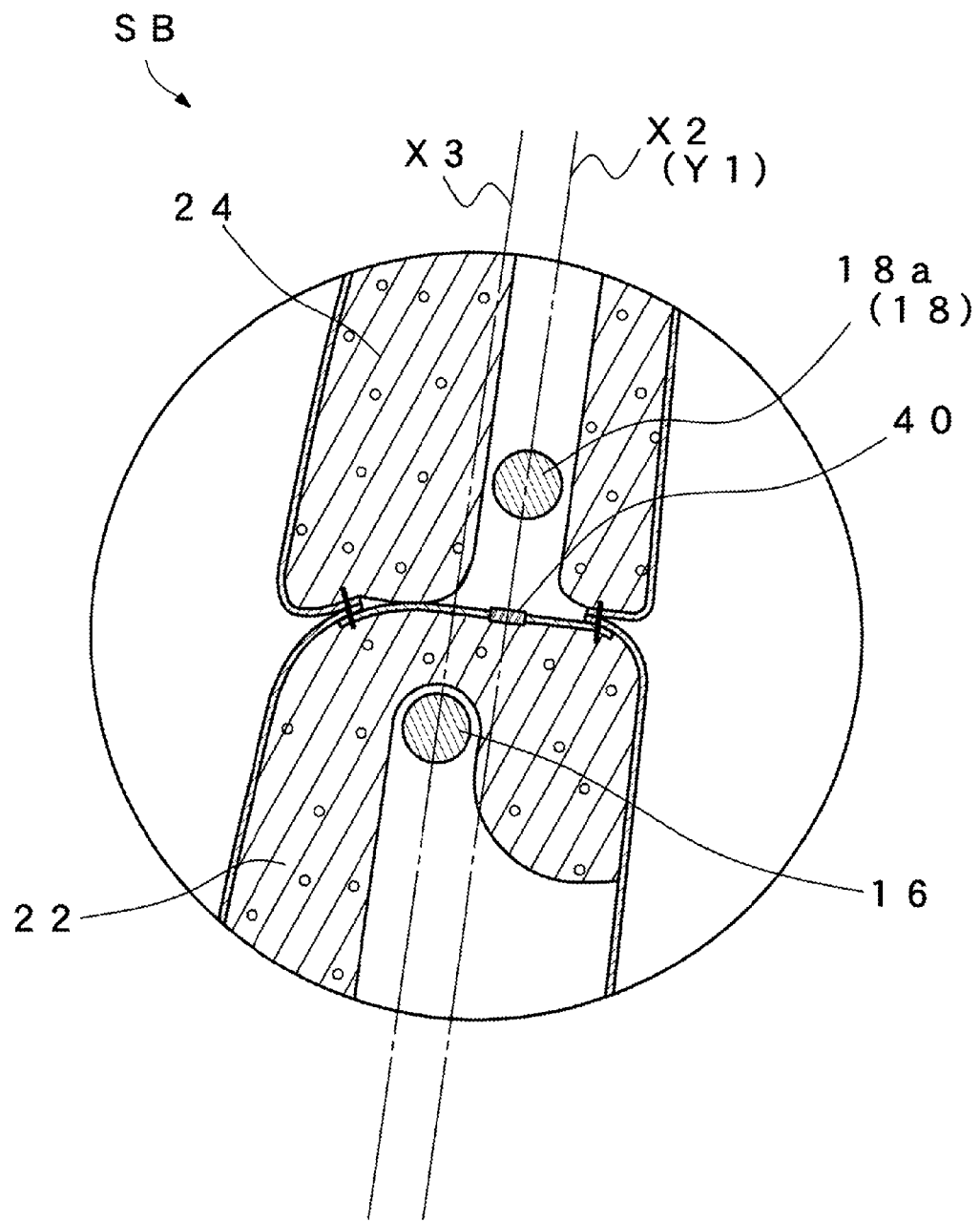
FIG. 16 is an enlarged explanatory side sectional view of a relevant portion of a center-foldable seat back.
Figure 17:
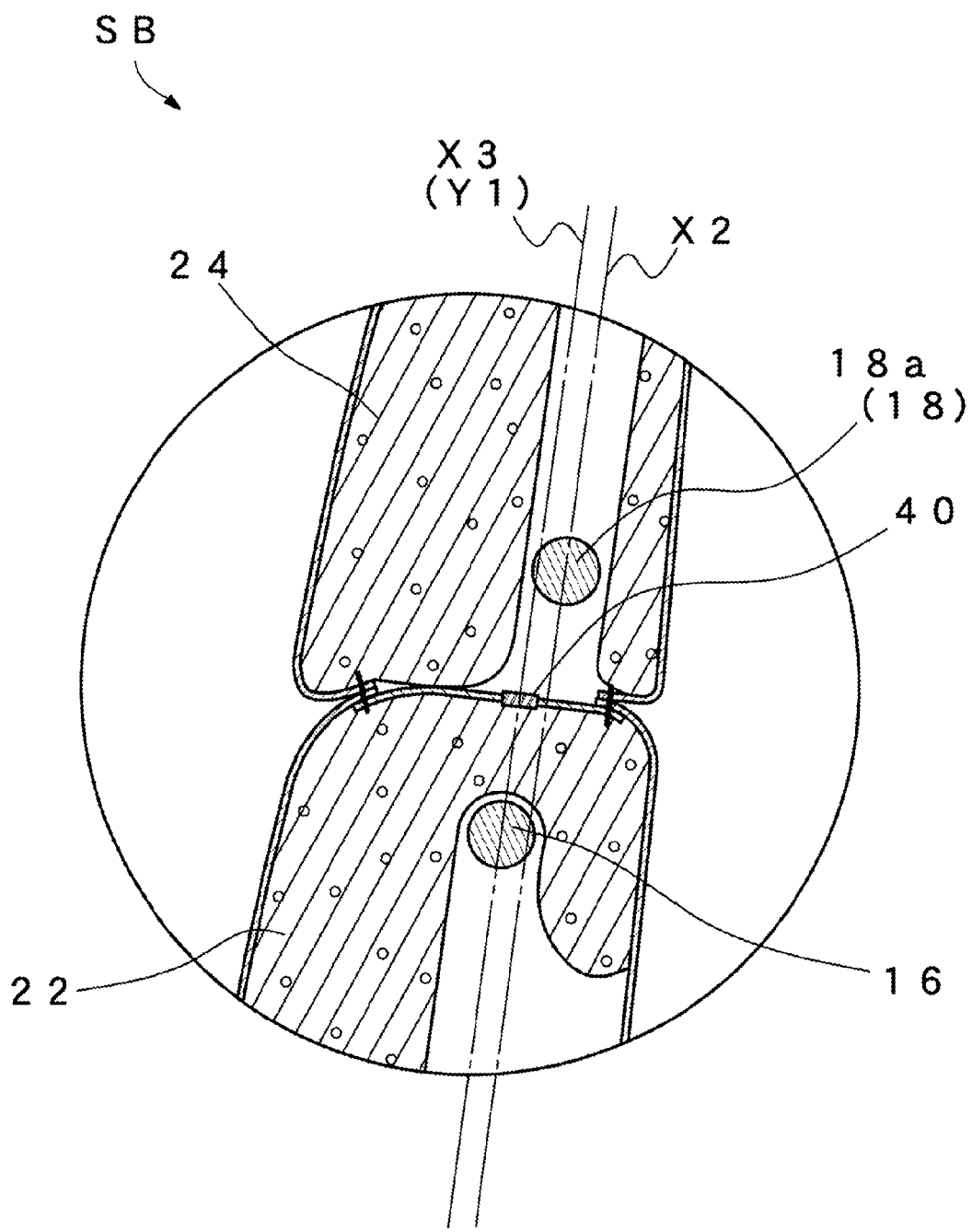
FIG. 17 is an enlarged explanatory side sectional view of a relevant portion of a center-foldable seat back.
Figure 18:
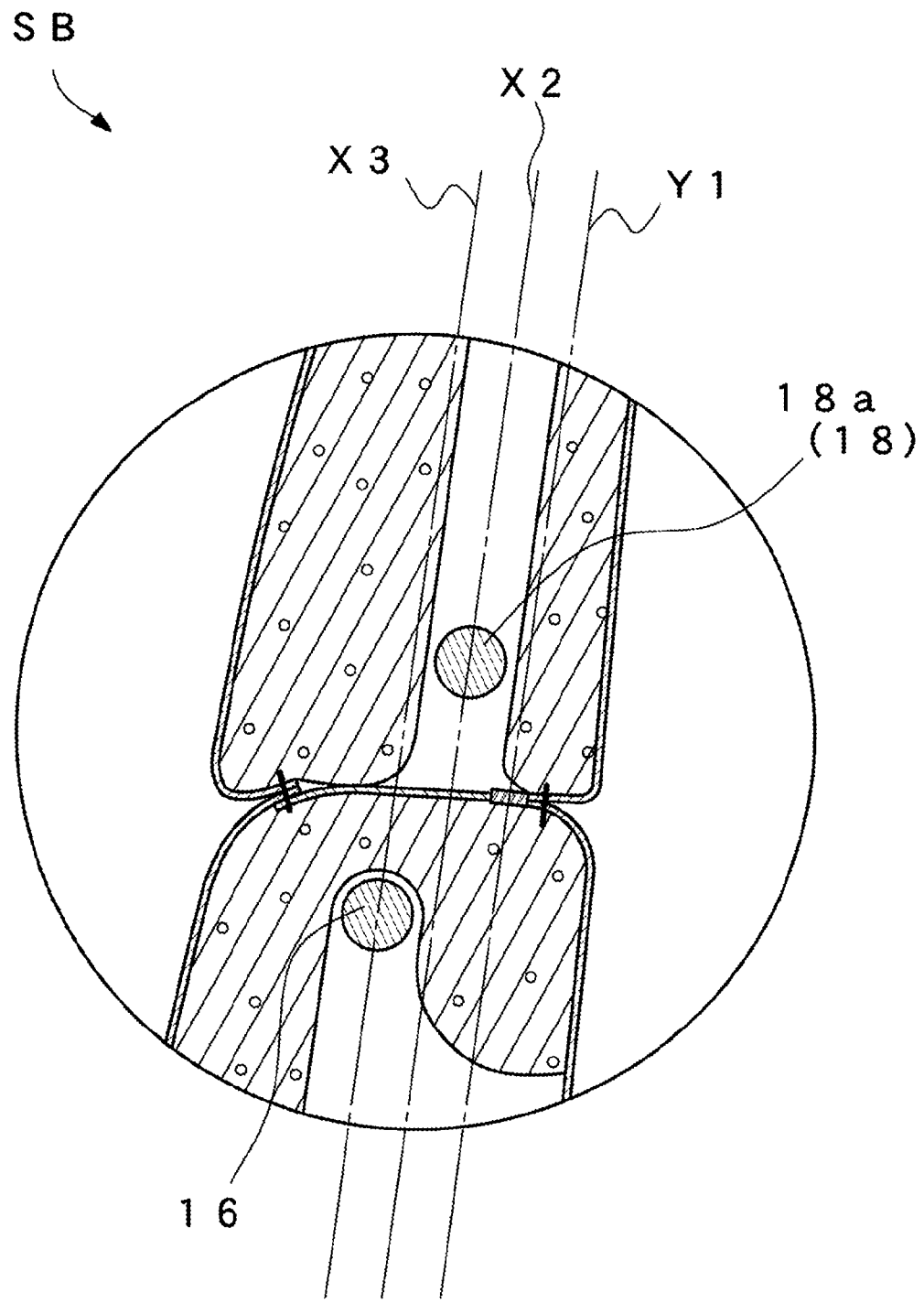
FIG. 18 is an enlarged explanatory side sectional view of a relevant portion of a center-foldable seat back.

As shown in FIGS. 16 to 18, regarding the extension line X2 in the up and down direction of the upper frame 18, the extension line X3 in the up and down direction of the lower frame 16, and the extension Y1 in the up and down direction of the central portion of the connecting member 40, the configuration is made such that the extension Y1 in the up and down direction of the central portion of the connecting member 40 does not coincide with either of the extension line X2 in the up and down direction of the upper frame 18 and the extension line X3 in the up and down direction of the lower frame 16. FIG. 16 shows an embodiment in which the extension Y1 in the up and down direction of the central portion of the connecting member 40 coincide with the extension line X2 in the up and down direction of the upper frame 18, but does not coincide with the extension line X3 in the up and down direction of the lower frame 16.

FIG. 17 shows an embodiment in which the extension Y1 in the up and down direction of the central portion of the connecting member 40 coincide with the extension line X3 in the up and down direction of the lower frame 16, but does not coincide with the extension line X2 in the up and down direction of the upper frame 18.

FIG. 18 shows an embodiment in which all of the extension line X2 in the up and down direction of the upper frame 18, the extension line X3 in the up and down direction of the lower frame 16, and the extension Y1 in the up and down direction of the central portion of the connecting member 40 do not coincide with each other.

The back frame of a seat back that is not of a center-foldable type is generally formed of one frame, whereas the center-foldable seat back SB is divided into two so that the upper frame 18 is tilted. Therefore, to keep the strength of the back frame 10, it is preferable that the upper frame 18 on the tilting side be made large. However, since the size of the seat back SB is restricted, there arises a disadvantage that if the upper frame 18 is made large, the distance between the upper frame 18 and the lower frame 16 decreases. Thus, when the trim cover 30 is placed, the frame (pipe) that is present above and below the connecting member 40 becomes a hindrance, which presents a disadvantage that the opening and closing work for the connecting member 40 requires much time and labor, and the workability at the time when the trim cover 30 is placed is poor.

As described above, regarding the extension line X2 in the up and down direction of the upper frame 18, the extension line X3 in the up and down direction of the lower frame 16, and the extension Y1 in the up and down direction of the central portion of the connecting member 40, the configuration is made such that the extension Y1 in the up and down direction of the central portion of the connecting member 40 does not coincide with either of the extension line X2 in the up and down direction of the upper frame 18 and the extension line X3 in the up and down direction of the lower frame 16. Therefore, the lower frame 16 and the upper frame 18 are assembled to not coincide with and not overlap on the connecting member 40 in the front and rear direction, so that the assembly is easy to do.

At this time, if the configuration is made such that the lower frame 16 is arranged in the front of the upper frame 18 as shown in FIG. 16 (the lower frame 16 lies in the front), a work space is secured on the lower side, so that the workability of work for assembling, from the rear, the connecting member 40 (fastener or clip) for connecting the upper and lower covers 34 and 32 to each other is improved. In particular, the opening and closing work for the connecting member 40 can be performed in the state in which the upper frame 18 is tilted forward, so that the work space on the upper side is secured further. Therefore, the workability of the work performed from the rear is improved.

In such a case, even if the positions of the upper frame 18 and the lower frame 16 change, the trim cover 30 using the same connecting member 40 can be placed.

FIGS. 19 to 23 show other embodiments, including one in which a relief portion (expanded portion) is provided on the side on which the upper and lower frames 18 and 16 face to the connecting member 40. By providing the relief portion in this manner, the assembling can be performed easily without considering the arrangement relationship among the extension line X2 in the up and down direction of the upper frame 18, the extension line X3 in the up and down direction of the lower frame 16, and the extension Y1 in the up and down direction of the central portion of the connecting member 40. That is, the presence of the relief portion secures the work space, thereby improving the workability further.

Figure 19:
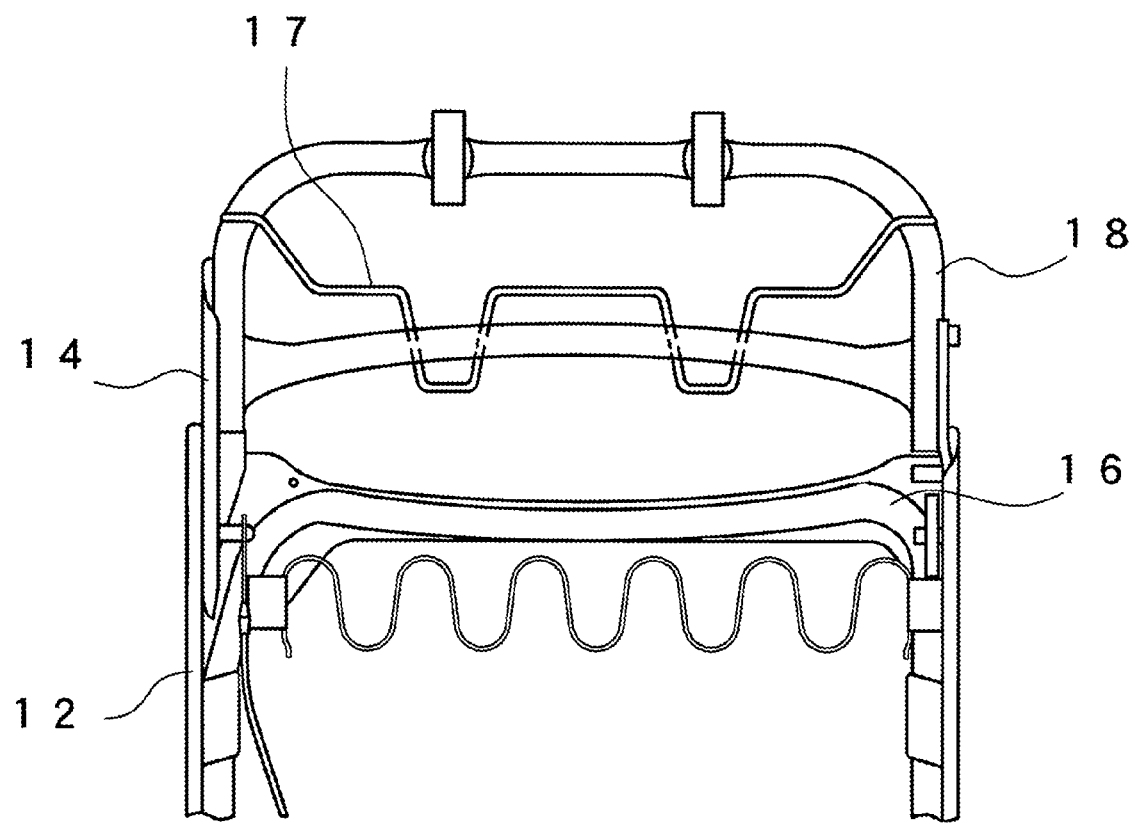
FIG. 19 is a schematic explanatory rear view of a frame used for a center-foldable seat back.
Figure 20:
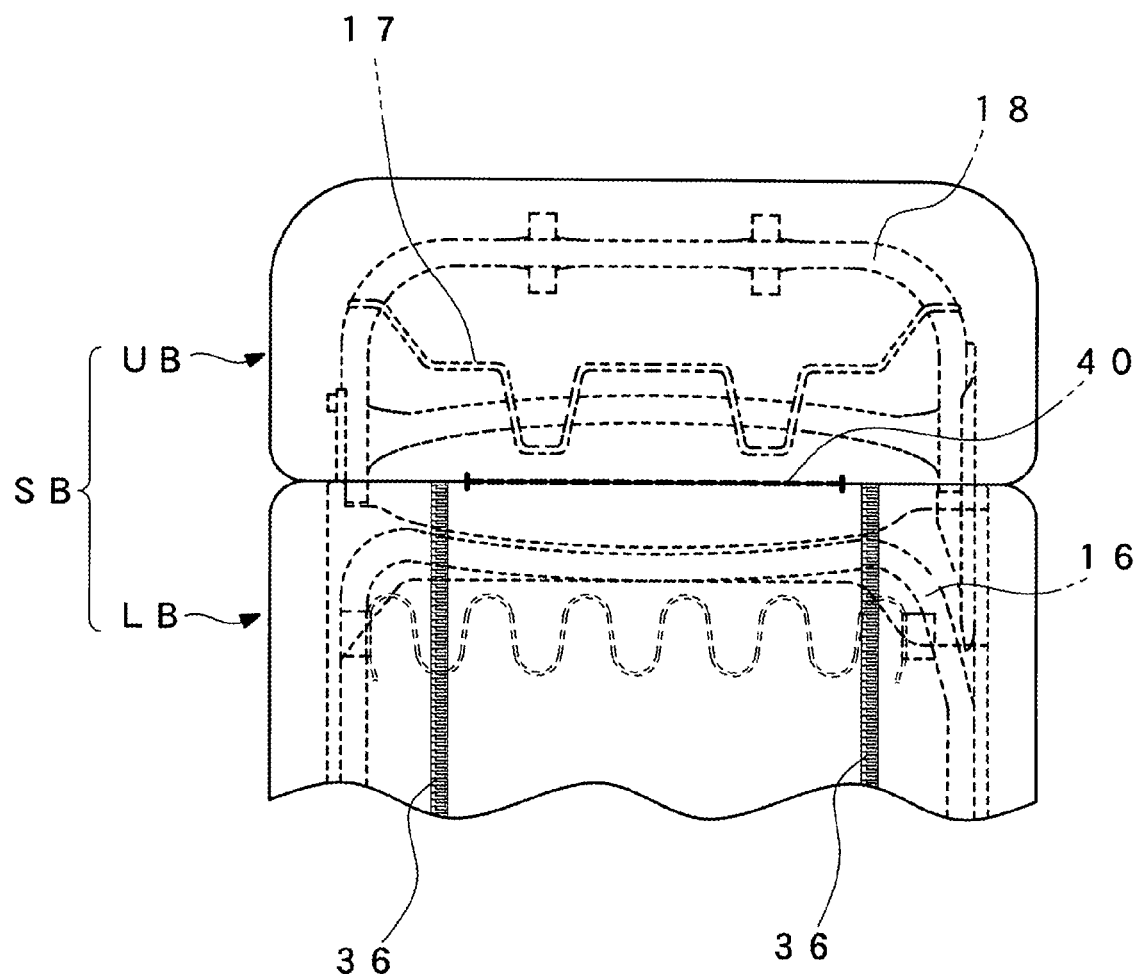
FIG. 20 is an explanatory rear view showing the relationship between a connecting member and back surface-side fasteners of a center-foldable seat back.

FIGS. 19 and 20 show an embodiment in which the upper frame 18 and the lower frame 16 expand from the side to the center side. In the embodiment shown in FIG. 20, consideration is made to prevent interference of both end parts of the connecting member 40, the vertical slide fasteners 36, and the surrounding wire 17 with each other.

Figure 21:
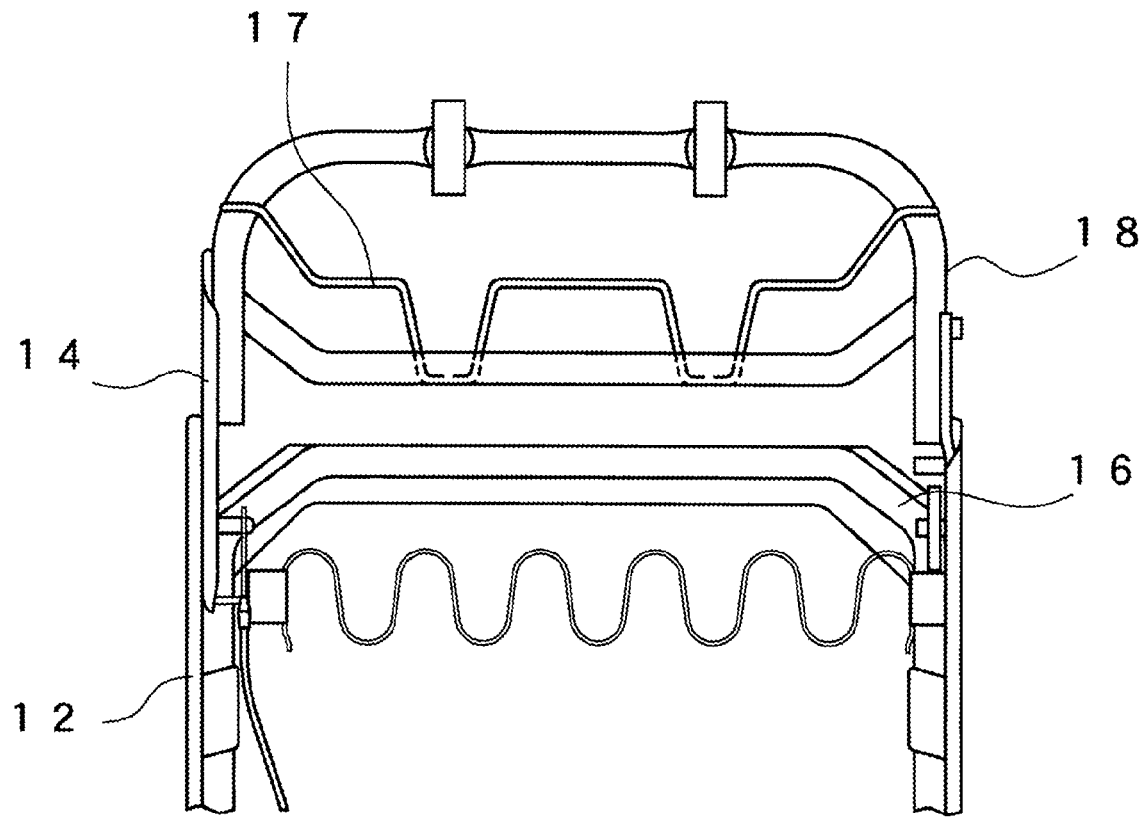
FIG. 21 is a schematic explanatory rear view of a frame used for a center-foldable seat back.
Figure 22:
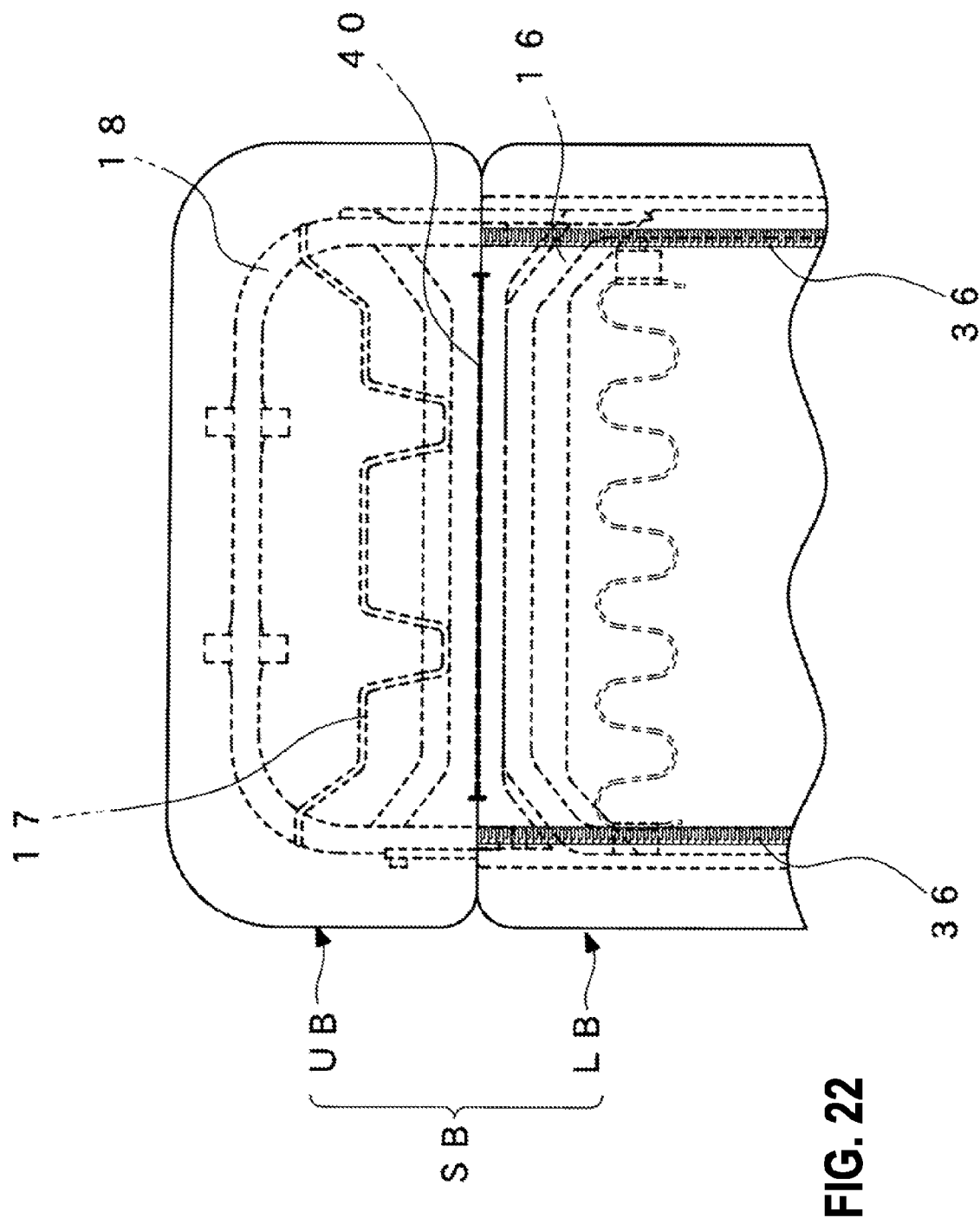
FIG. 22 is an explanatory rear view showing the relationship between a connecting member and back surface-side fasteners of a center-foldable seat back.

FIGS. 21 and 22 show an embodiment in which the upper frame 18 and the lower frame 16 are provided with the relief portions (the expanded portions) at the side positions. By this configuration, the start point and the end point of the connecting member 40 can be arranged at the positions of the relief portions.

Figure 23:
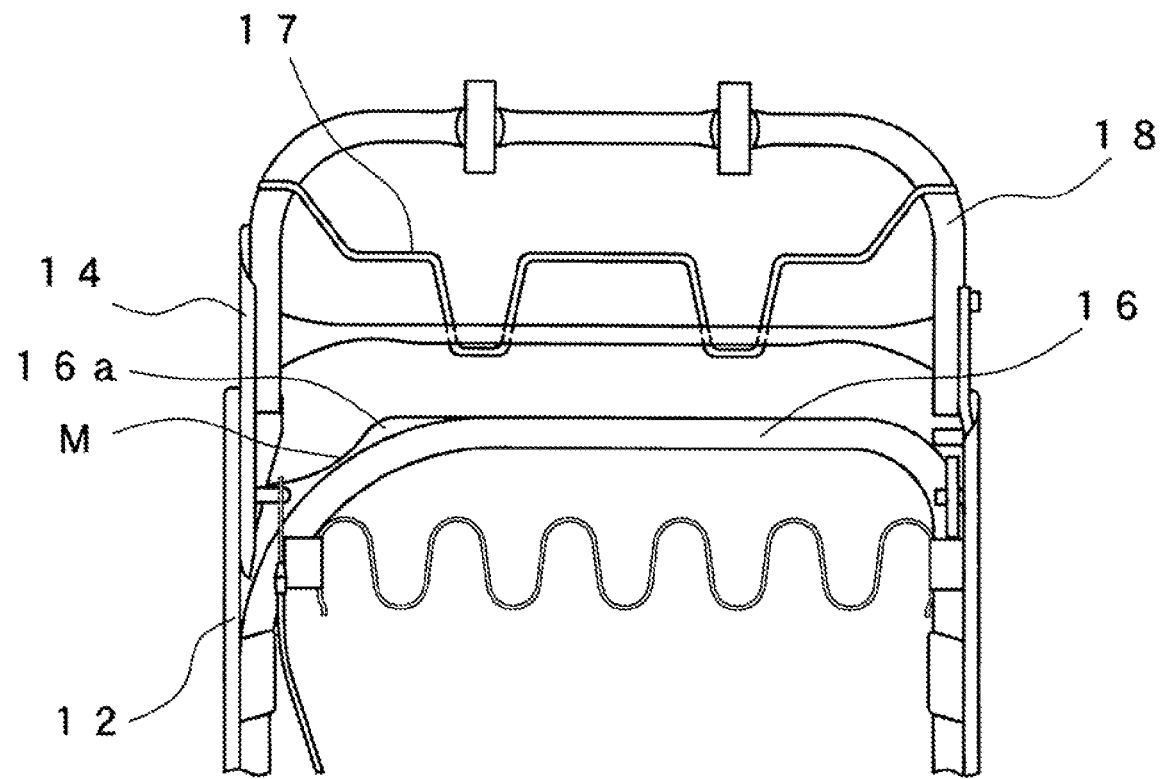
FIG. 23 is a schematic explanatory rear view of a frame used for a center-foldable seat back.

FIG. 23 shows an embodiment in which the side on which the lower side of the intermediate part 18a of the upper frame 18 faces to the connecting member 40, that is, the lower side is made thin to secure the work space. In this embodiment, the reinforcing plate of the lower frame 16 is cut out at the position indicated by letter M in FIG. 23, whereby the work space relating to the connecting member is secured, and the interference is prevented.

Although not shown in the Figure, the work space can also be secured by making the intermediate part 18a itself of the upper frame 18 thinner (smaller in diameter) than the lower frame 16.

Also, if the intermediate part 18a itself of the upper frame 18 is formed by a pipe having a flattened shape from the up and down direction, and is attached so that the flat surface of pipe is substantially horizontal, the work space can be secured in the same manner. In this case, if the intermediate part 18a is attached so that the direction of the flattened surface of the intermediate part 18a is parallel with the direction in which the worker inserts his or her hand from the rear slantwise lower side when placing the trim cover 30, the workability is improved further.

The above-described embodiment is an embodiment in which the upper frame 18 is modified variously as a work region securing element because the connecting member 40 is arranged at a position closer to the upper frame 18 than to the lower frame 16. In the case of the configuration in which the connecting member 40 is arranged close to the lower frame 16, by deforming the side on which the lower frame 16 faces to the connecting member 40 in the same way as the above-described various deformations of the upper frame, the work space between the connecting member 40 and the lower frame 16 can be secured, so that the same effect can be achieved.

In all of the above-described cases, the workability is improved further by performing work in the state in which the upper frame is tilted.

Figure 24:
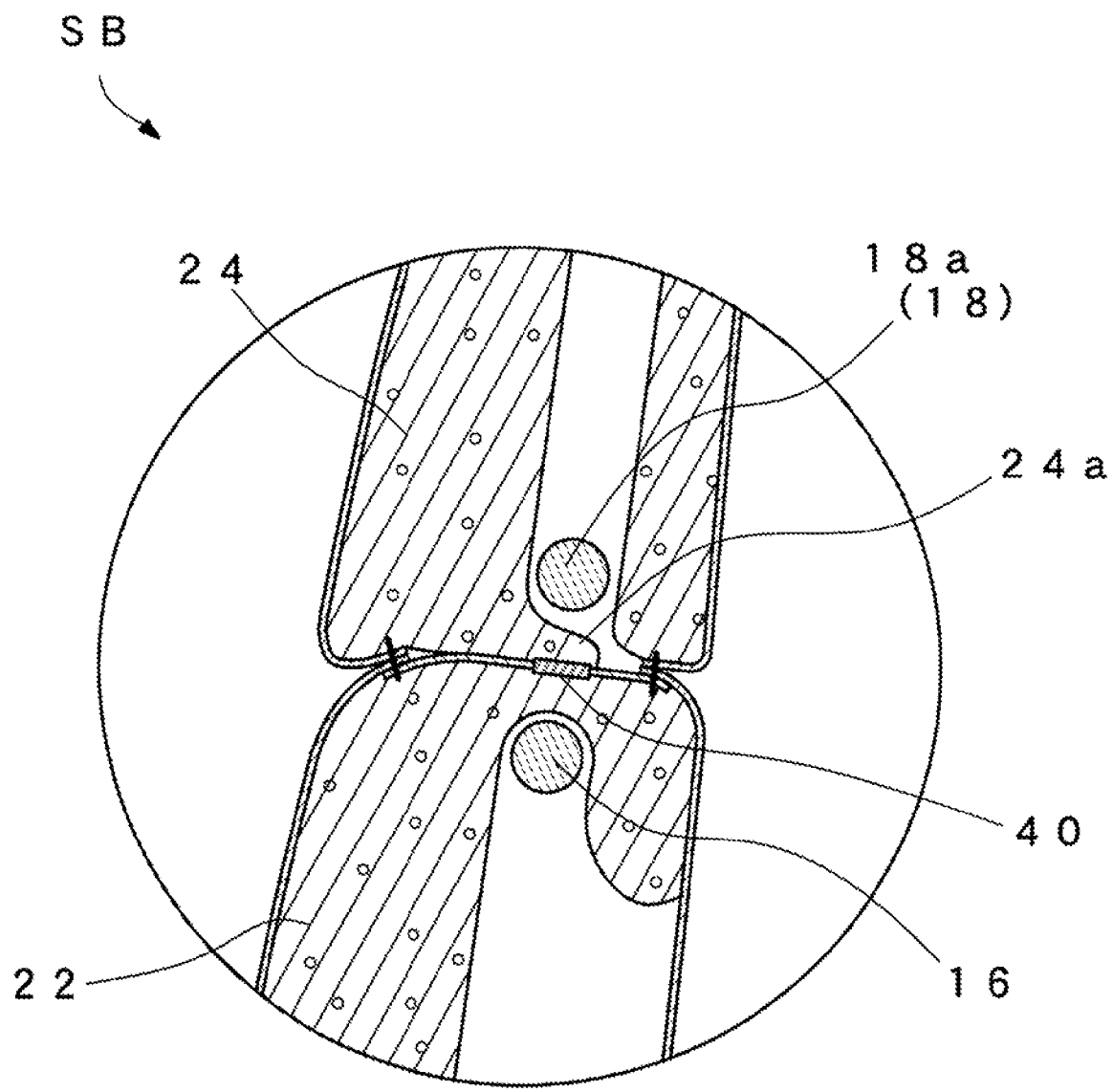
FIG. 24 is an enlarged explanatory side sectional view of a relevant portion of a center-foldable seat back.

FIG. 24 shows an embodiment in which the lower pad 22 is assembled to surround the periphery of the lower frame 16. In this embodiment, the upper pad 24 is formed with an extension part 24a that extends rearward so that the lower end part rear side thereof is interposed between the intermediate part 18a of the upper frame 18 and the connecting member 40.

Generally, to keep the strength of the center-folding portion, the space between the upper frame 18 and the lower frame 16 must be decreased. As a result, when the connecting member 40 comes into contact with the upper frame 18 or the lower frame 16, an abnormal sound may be produced, or the connecting member 40 may be damaged.

This extension part 24a is a contact preventing element. By providing a part of the upper pad 24 between the connecting member 40 and the upper frame 18, the contact of the connecting member 40 with the upper frame 18 can be restrained, so that the production of abnormal sound can be suppressed. Also, since the lower pad 22 is also interposed between the lower frame 16 and the connecting member 40, the lower pad 22 is a contact preventing element. Therefore, the contact of the connecting member 40 with the lower frame 16 can be restrained, so that the production of abnormal sound can be suppressed. Also, the damage to the connecting member 40 can be restrained.

Figure 25:
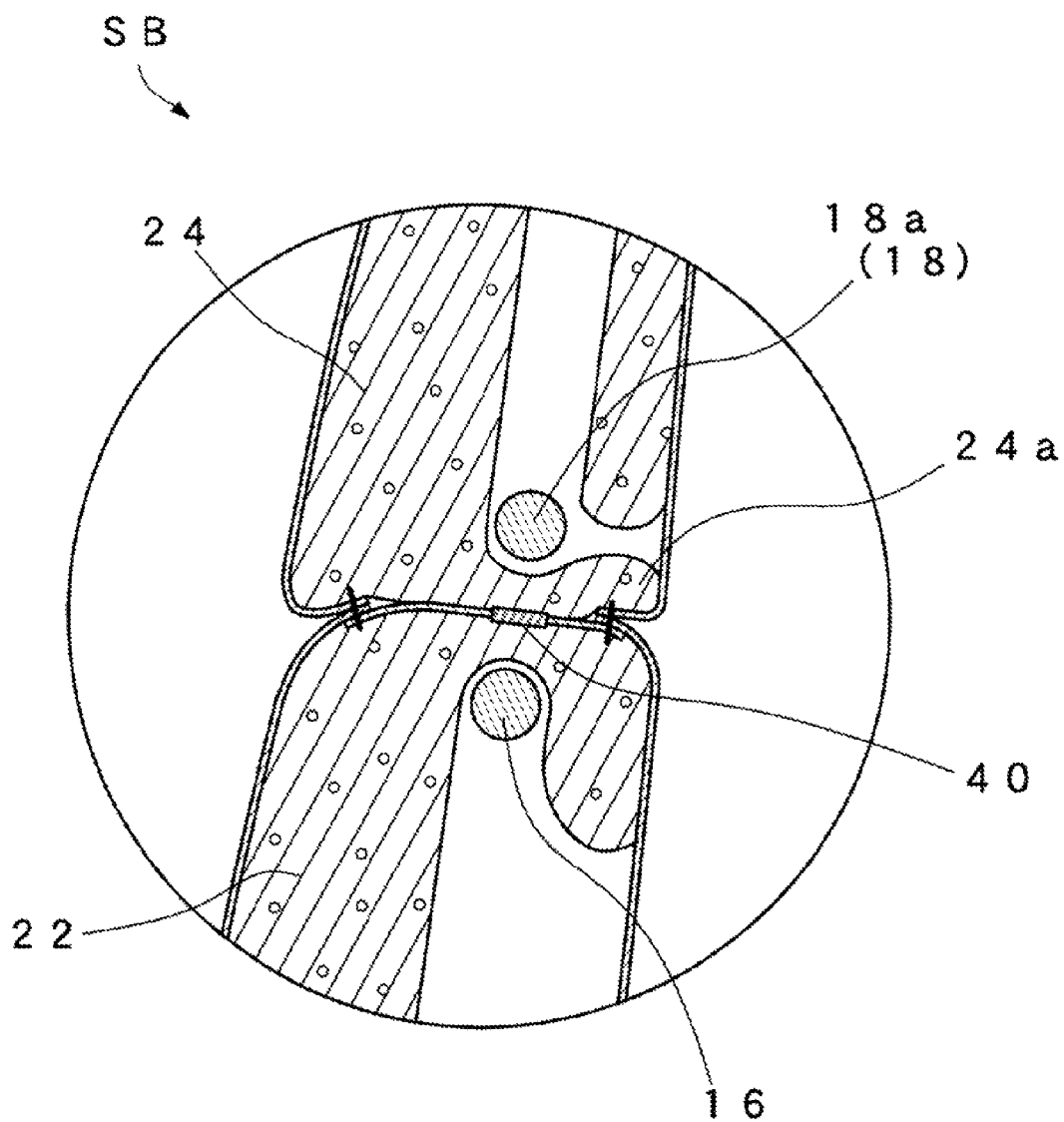
FIG. 25 is an enlarged explanatory side sectional view of a relevant portion of a center-foldable seat back.

FIG. 25 shows an embodiment in which the extension part 24a of the upper pad 24 has a shape such that the extension part 24a is further extended rearward and the rear end part thereof is slightly raised upward to cover the upper frame 18. The lower pad 22 is also provided to cover the lower frame 16. If the upper and lower pads 24 and 22 have a shape that covers the upper and lower frames 18 and 16, respectively, the production of abnormal sound caused by the contact can be suppressed, and also the positional shift of the upper and lower pads 24 and 22 and the connecting member 40 caused by vibrations or the like can be prevented.

Figure 26:
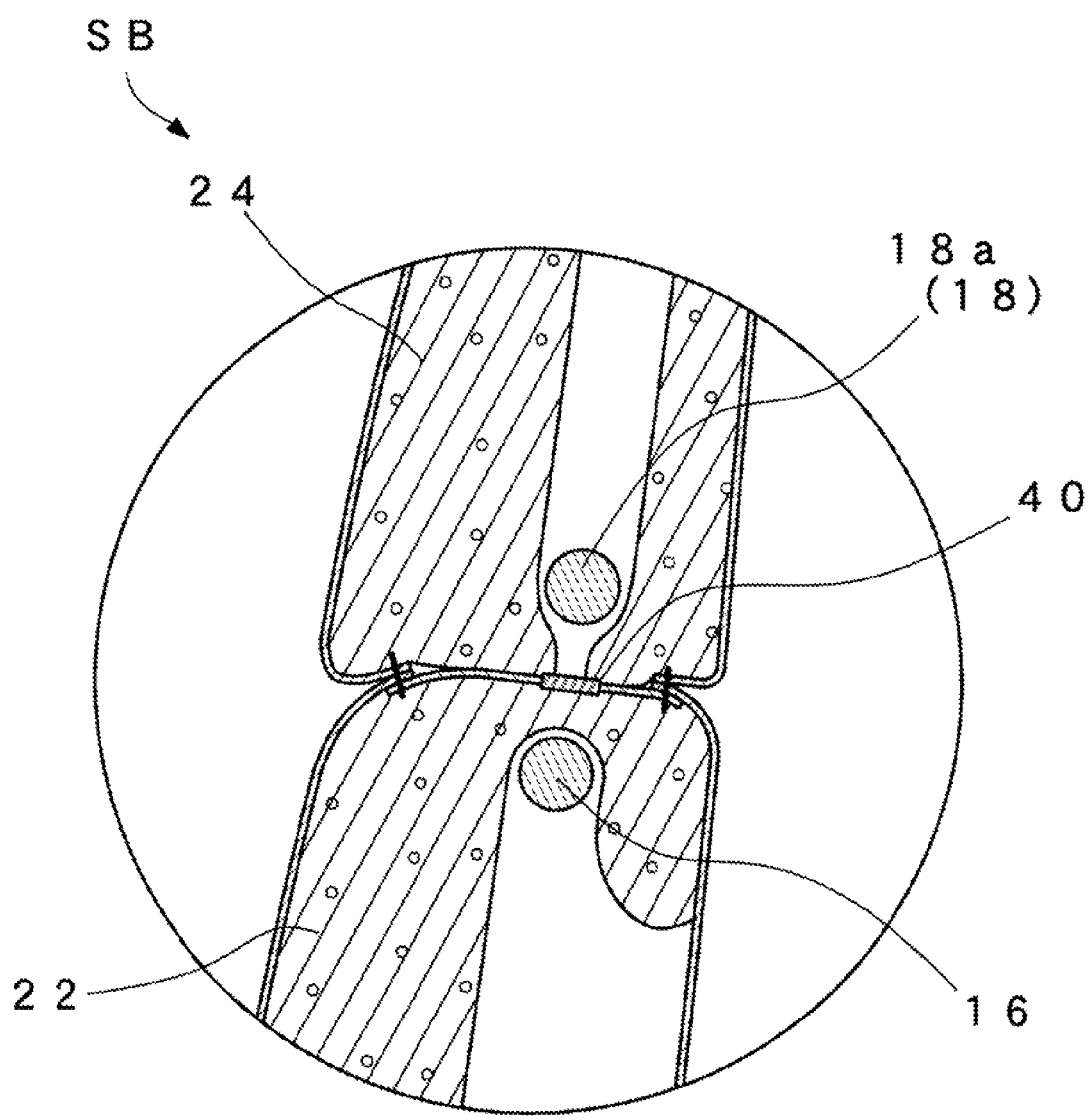
FIG. 26 is an enlarged explanatory side sectional view of a relevant portion of a center-foldable seat back.

In this case, the upper pad 24 (or the lower pad 22) need not completely cover the upper frame 18 (or the lower frame 16), and the space through which the pad surrounds the frame has only to be smaller than the width of the connecting member 40. For example, as shown in FIG. 26, the upper frame 18 side of the lower end part of the upper pad 24 extends toward the direction of the upper frame 18 (that is, the inside direction of the upper pad 24) to an extent to not hinder the opening and closing of the connecting member 40, and the space smaller than the width of the connecting member 40 is formed. The inside lower end part of the upper pad 24 is provided to extend downward to an extent to push the periphery of the connecting member 40. By forming the upper pad 24 in such a shape, the connecting member 40 is not brought into contact with the upper frame 18 so that the production of abnormal sound and the damage to the connecting member 40 can be prevented.

Figure 27:
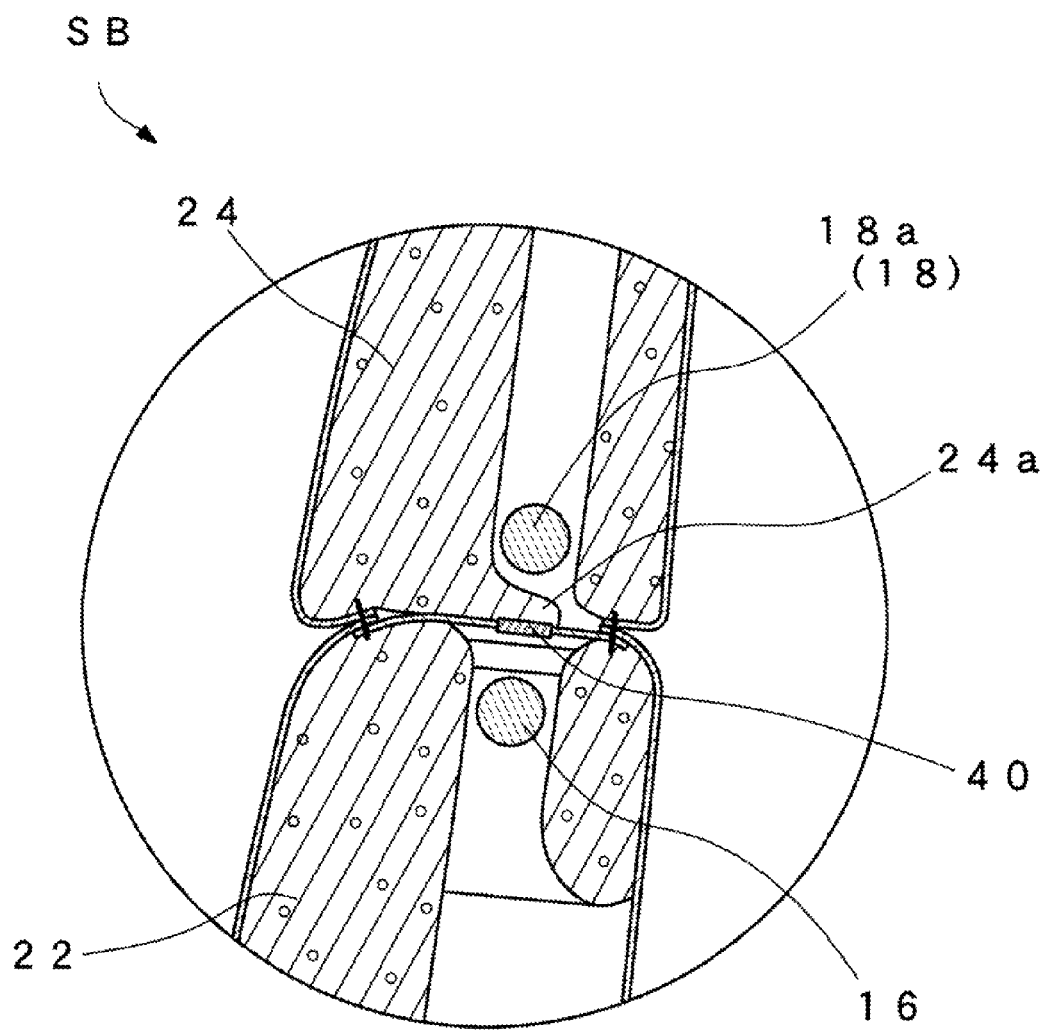
FIG. 27 is an enlarged explanatory side sectional side view of a relevant portion of a center-foldable seat back.

As in the embodiment shown in FIG. 27, the configuration can be made such that the upper pad 24 is provided with the extension part 24a that is the same as in the embodiment shown in FIG. 24, and the lower pad 22 is not provided with a cushion at a position at which the connecting member 40 is arranged.

In all of the above-described cases, since the upper pad 24 and/or the lower pad 22 are used as the contact preventing element, a separate member need not be used to prevent an abnormal sound caused by the contact, so that the number of parts can be reduced. Also, the work for attaching the pad 20 to the upper and lower frames 18 and 16 is simplified.

In the case where the upper frame 18 or the lower frame 16 is joined to the side frame or the like at the side position by welding, the welded portion becomes wide in width including the welded members. Therefore, by attaching the upper pad 24 or the lower pad 22 as the contact preventing element to intrude between the welded portion and the connecting member 40 at the side position of the upper frame 18 or the lower frame 16 as well, the production of abnormal sound caused by the contact of the connecting member 40 with the welded portion can be prevented.

Figure 28:
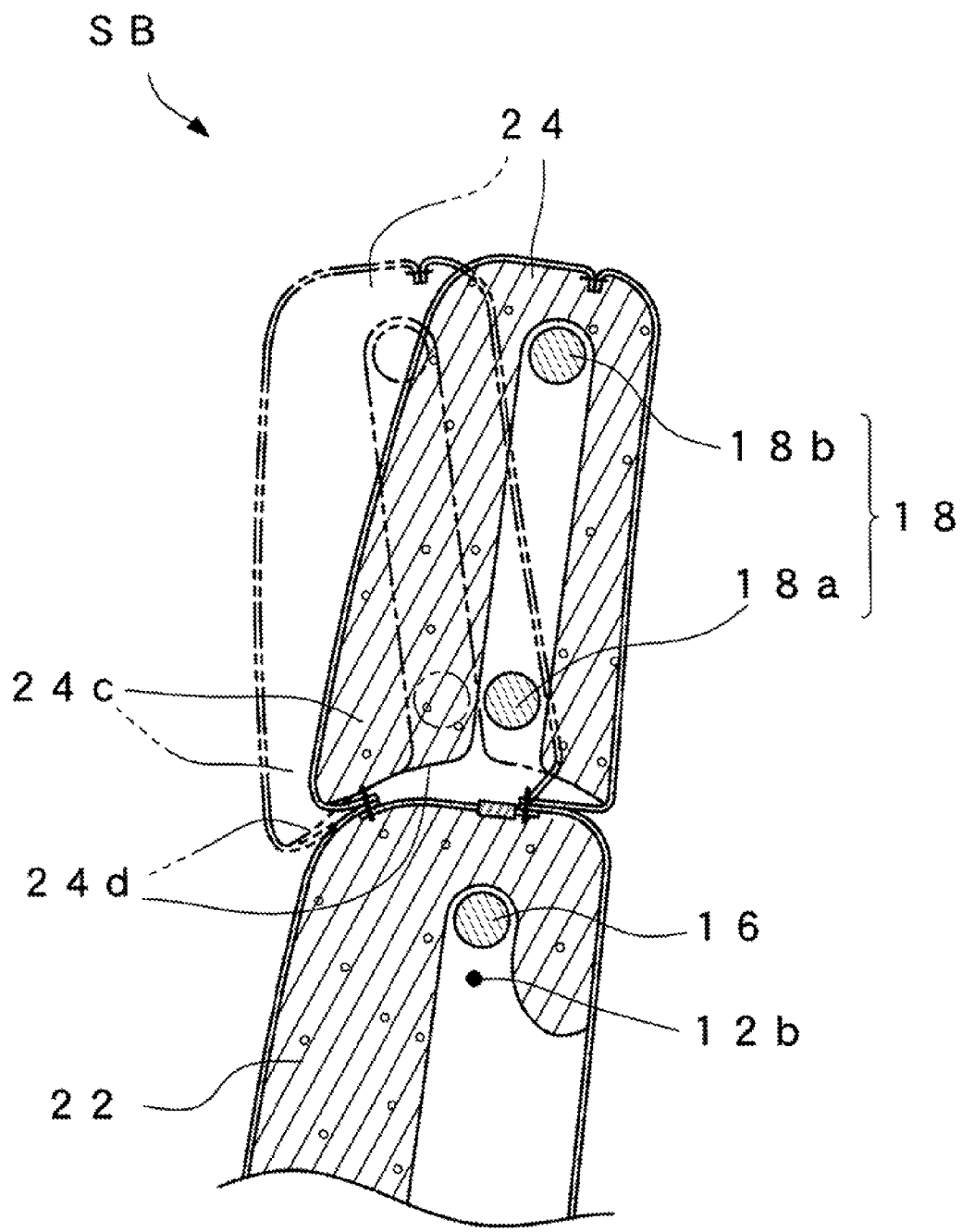
FIG. 28 is an explanatory side sectional view of a relevant portion of a center-foldable seat back.

Also, as shown in FIG. 28, the shaft part 12b, which is the rotation axis of the upper frame 18 supporting the seat back upper part UB, is arranged below the lower frame 16 supporting the seat back lower part LB, and the seat back upper part UB is tiltable forward around the shaft part 12b relative to the seat back lower part LB.

Generally, the center-foldable seat back SB has a bad appearance because when the seat back upper part UB tilts, the clearance and the difference in level in the center-folding portion increase. Therefore, in the embodiment shown in FIG. 28, by arranging the shaft part 12b below the lower frame 16, the movement in the up and down direction at the time when the seat back upper part UB tilts can be decreased, so that the clearance is decreased, and a preferable clearance can be maintained.

Further, by forming an extension part 24c formed by extending the front surface lower end part of the upper pad 24 of the seat back upper part UB downward, at the tilting time, the spread of clearance can be restrained by the extension part 24c so that the appearance is improved.

Also, if a lower end surface 24d of the upper pad 24 of the seat back upper part UB is formed in a shape following the movement path of the seat back upper part UB, that is, an arcuate shape, the clearance can be made small as far as possible. Therefore, the clearance does not spread at the time of movement, and the seat back upper part UB can move in a fixed state, so that the appearance of the center-folding portion can be improved.

Figure 29:
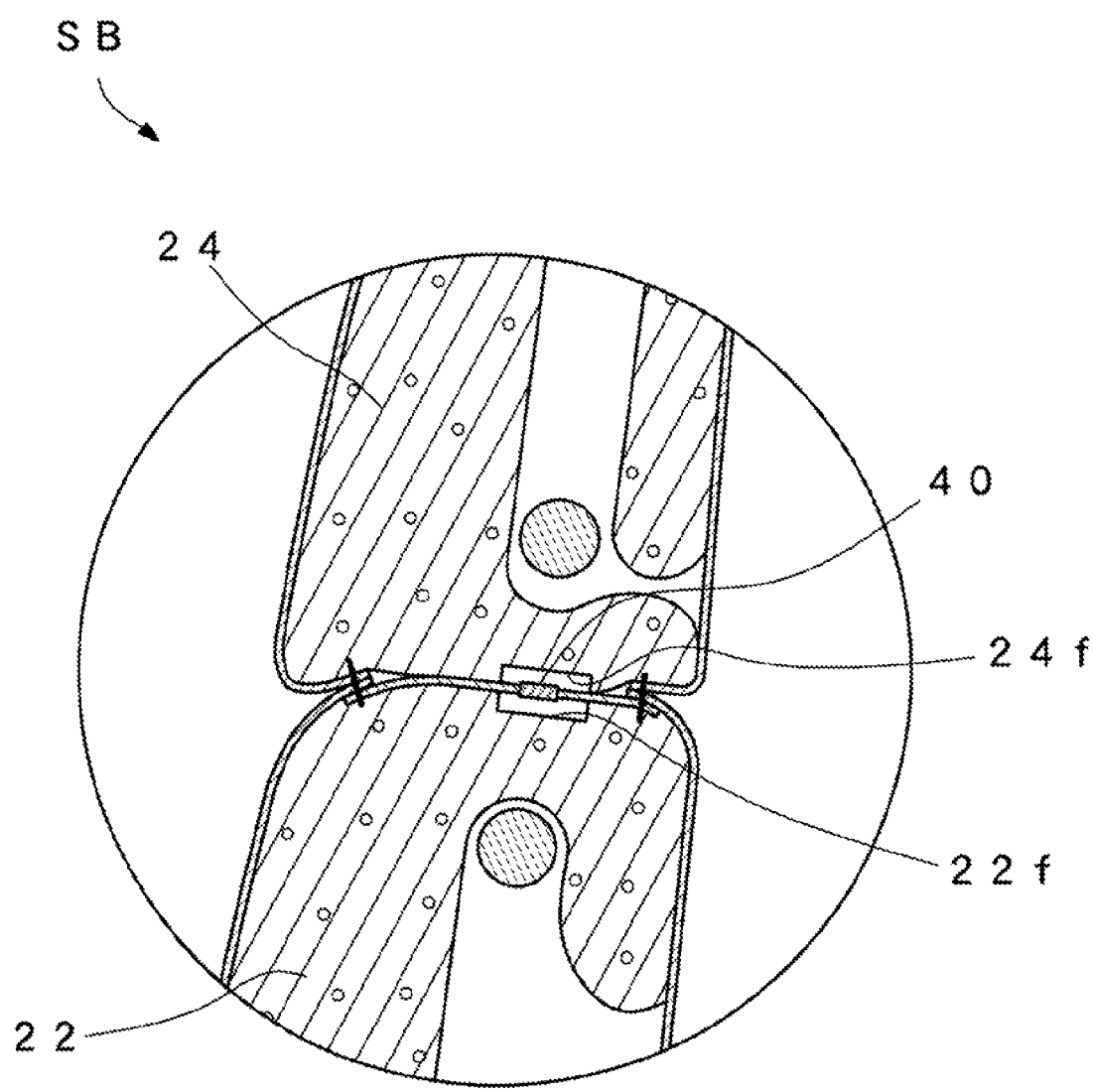
FIG. 29 is an enlarged explanatory side sectional view of a relevant portion of a center-foldable seat back.

In the embodiment shown in FIG. 29, a concave part 24f and a concave part 22f each having a rectangular cross section, serving as the contact preventing element, are provided between the upper pad 24 and the connecting member 40 and between the lower pad 22 and the connecting member 40, respectively, to surround the connecting member 40. If the concave parts are formed at the arrangement position of the connecting member 40 to surround the connecting member 40, especially, to include the range in which the connecting member 40 is moved by the tilting of the seat back upper part UB, spaces can be secured between the upper pad 24 and the connecting member 40 and between the lower pad 22 and the connecting member 40. Therefore, when the seat back upper part UB is tilted, the connecting member 40 is less liable to be caught by the upper pad 24 and the lower pad 22, and moves smoothly.

When the connecting member 40 is opened or closed, the connecting member 40 can be prevented from biting the upper pad 24 and the lower pad 22, so that the workability for opening and closing the connecting member 40 is enhanced. Further, since the connecting member 40 does not come into contact with the upper pad 24 and the lower pad 22 when the seat back upper part UB is tilted, an abnormal sound can be prevented from being produced by the contact.

Figure 30:
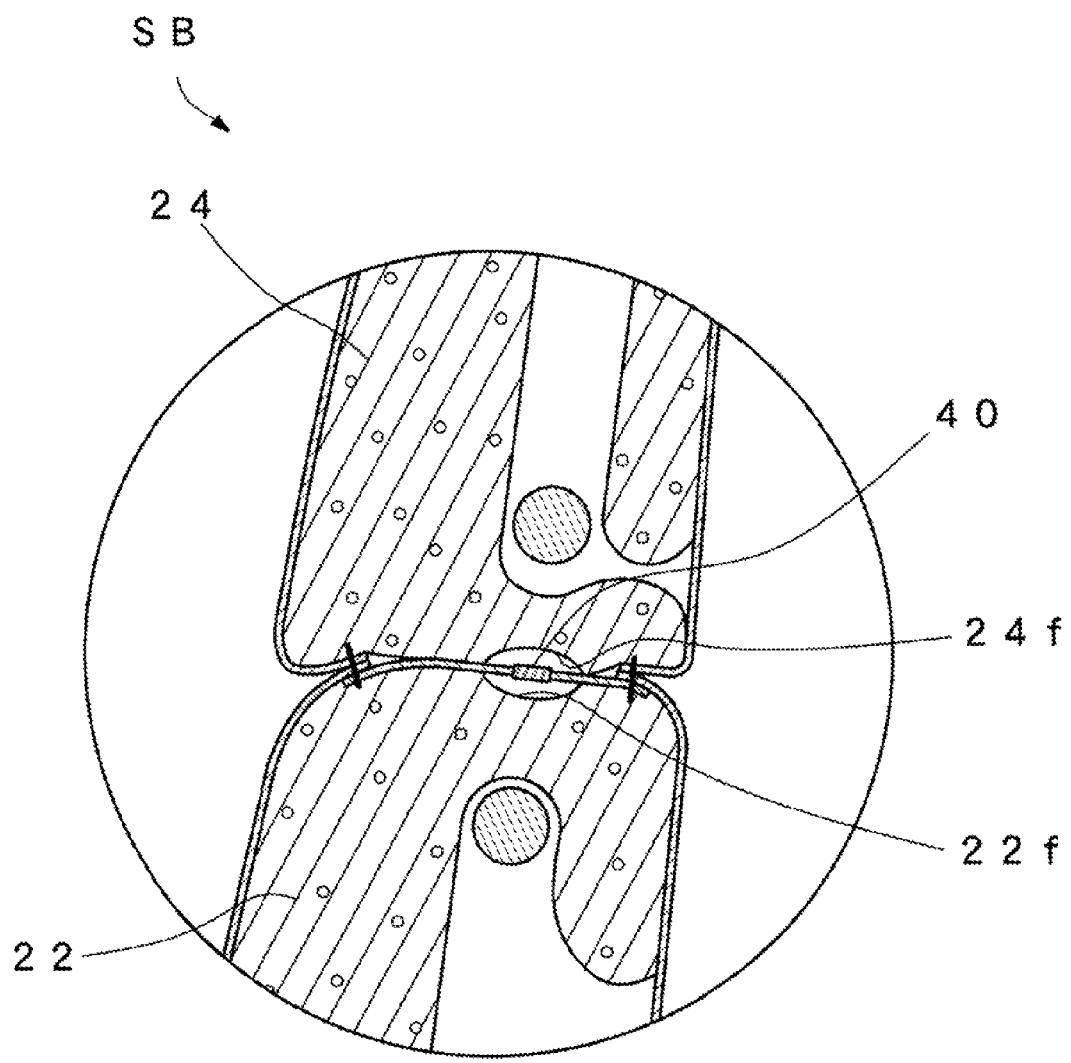
FIG. 30 is an enlarged explanatory side sectional view of a relevant portion of a center-foldable seat back.
Figure 31:
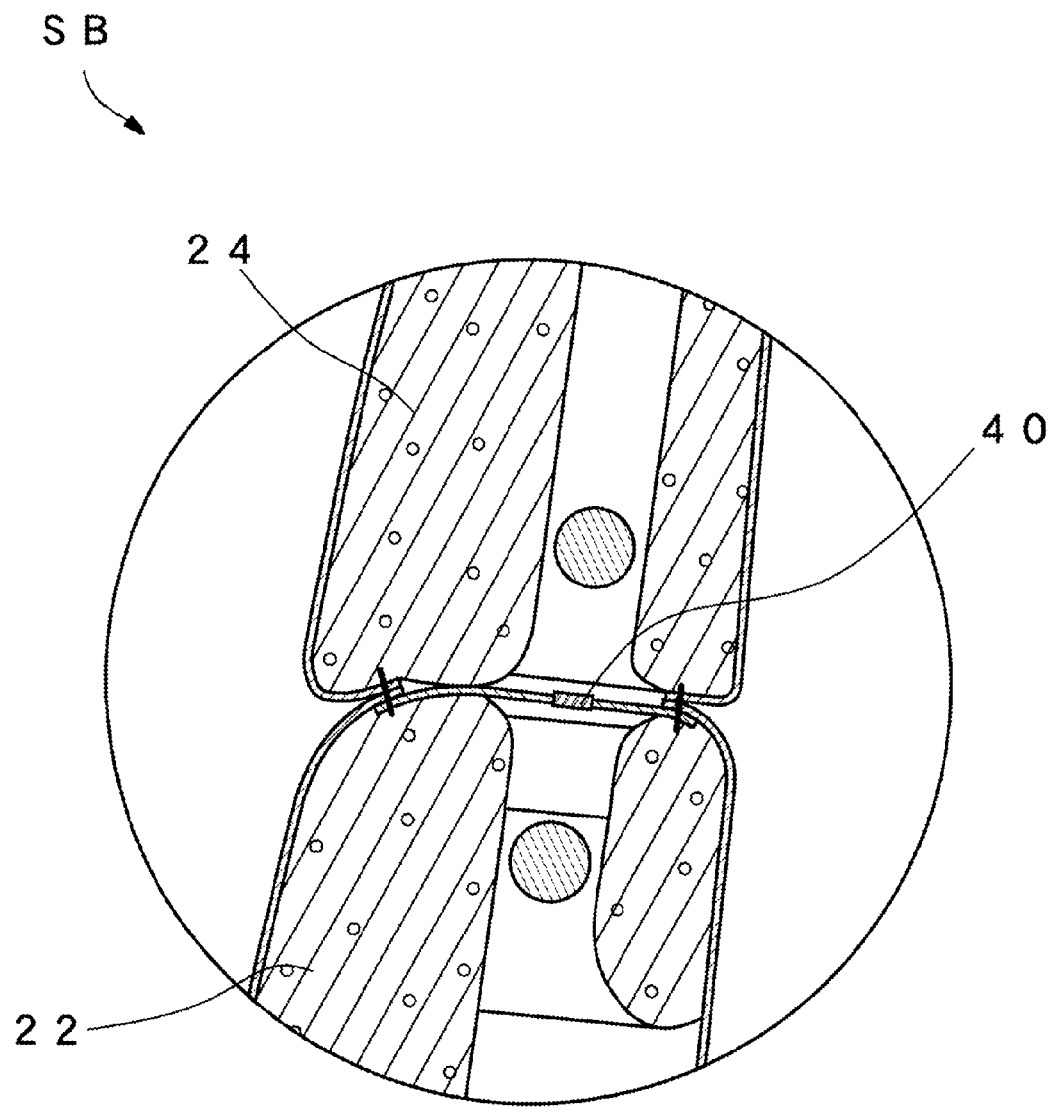
FIG. 31 is an enlarged explanatory side sectional view of a relevant portion of a center-foldable seat back.
Figure 32:
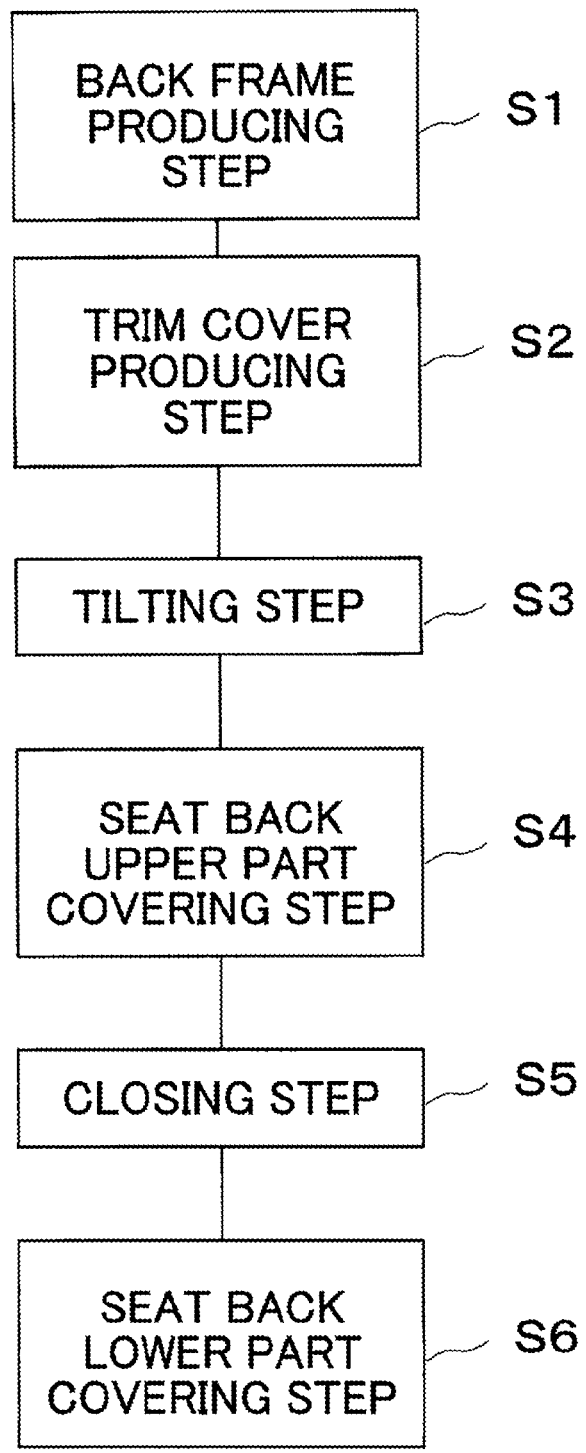
FIG. 32 is a flow diagram showing the manufacturing process of a center-foldable seat back.

The concave part 24f formed between the upper pad 24 and the connecting member 40 and the concave part 22f formed between the lower pad 22 and the connecting member 40 each may have a semi-elliptical cross section as in the embodiment shown in FIG. 30. These concave parts 24f and 22f each may have any shape such that a fixed space is formed between the connecting member 40 and the upper and lower pads 24 and 22. Further, as in the embodiment shown in FIG. 31, the upper pad 24 and the lower pad 22 may be arranged to not be present around the arrangement position of the connecting member 40.

Only the concave part 24f between the lower side of the upper pad 24 and the connecting member 40 may be formed. In this case as well, similarly, when the seat back upper part UB is tilted frequently, the connecting member 40 can be prevented from being caught by the upper pad 24 and becoming incapable of moving smoothly.

Next, the method of manufacturing the center-foldable seat back SB configured as described above will be explained with reference to FIGS. 32 to 34.

The center-foldable seat back SB is a center-foldable seat back SB in which the seat back upper part UB can be tilted forward relative to the seat back lower part LB. The method of manufacturing the center-foldable seat back SB includes a back frame producing step S1, a trim cover producing step S2, a tilting step S3, a seat back upper part covering step S4, a closing step S5, and a seat back lower part covering step S6.

The back frame producing step S1 and the trim cover producing step S2 can be carried out in advance by separate processes. The tilting step S3, the seat back upper part covering step S4, the closing step S5, and the seat back lower part covering step S6 are steps carried out continuously. For the seat back upper part covering step and the tilting step, either of them may be carried out prior.

These steps are explained below. In the back frame producing step S1, the back frame 10, which has the upper frame 18 supporting the seat back upper part UB and the lower frame 16 supporting the seat back lower part LB and is configured so that the upper frame 18 is connected to be tiltable relative to the lower frame 16, is produced.

In the trim cover producing step S2, the upper cover 34 and the lower cover 32 are sewn together along the entire periphery at the mutual contact position, the first connecting part 42 is disposed at the sewing position of the front cover 34a, 32a, and the second connecting part 44 is disposed at the sewing position of the rear cover 34c, 32c, whereby the trim cover 30 to which the connecting member 40 is attached is produced.

Figure 33:
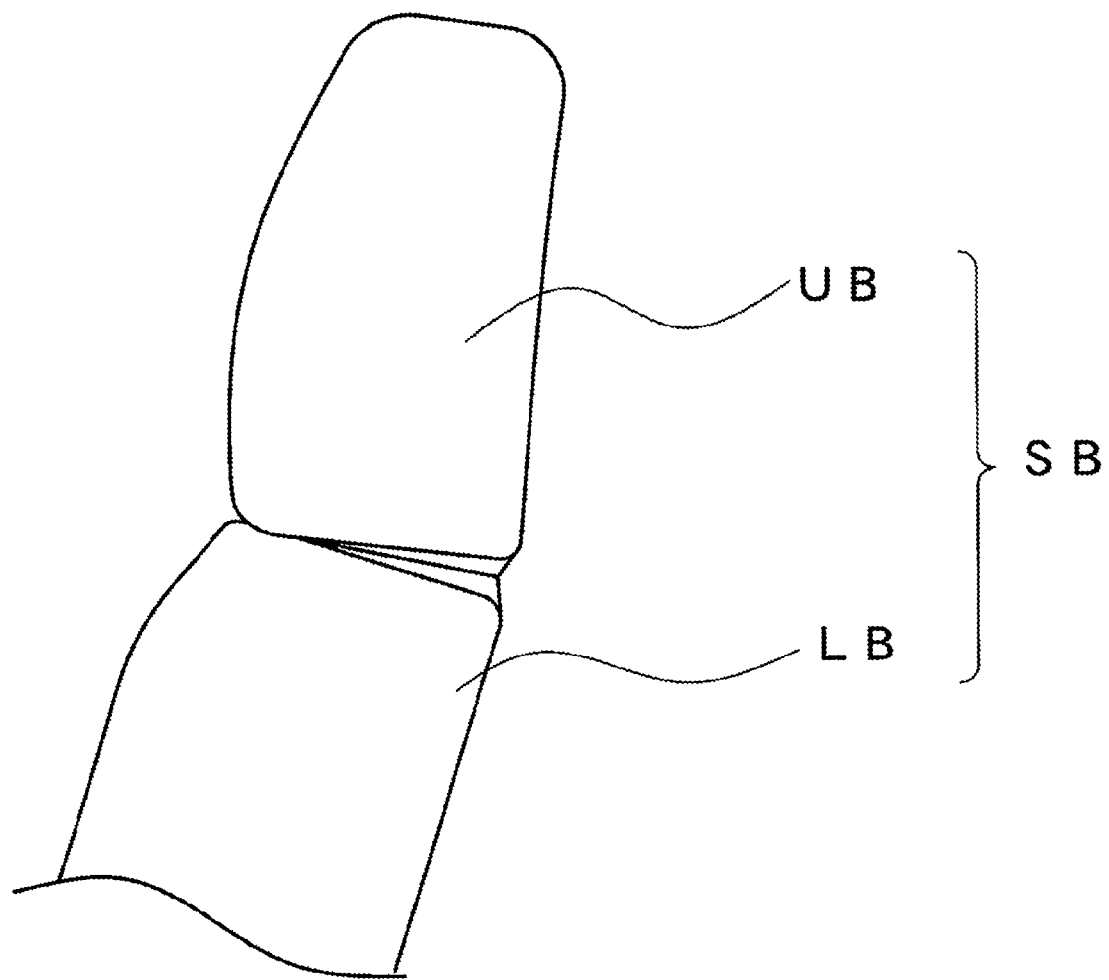
FIG. 33 is an explanatory side view of a center-foldable seat back.

In the tilting step S3, the upper frame 18 produced in the back frame producing step S1 is held in a tilted state by being tilted relative to the lower frame 16 as shown in FIG. 33. FIG. 33 is an explanatory view of the center-foldable seat back SB after the upper pad 24 and the upper cover 34 have been attached to the upper frame 18. However, the upper frame 18 may be tilted relative to the lower frame 16 before the upper pad 24 and the upper cover 34 are attached to the upper frame 18 as in the tilting step S3.

The state in which the upper frame 18 is tilted farthest to the front in the tilting step S3 is a state in which the space at the rear of the upper frame 18 and the lower frame 16 opens largest, and a state in which the space above the connecting member 40 is secured. In this tilting state, the work region for the work of placing the trim cover 30 from the rear of the seat back SB, especially, the work of connecting the first connecting part 42 and the second connecting part 44 to each other is secured to be the largest. Therefore, when the trim cover 30 is placed in the method of manufacturing the center-foldable seat back SB, the work is preferably performed in this tilting state.

Figure 34:
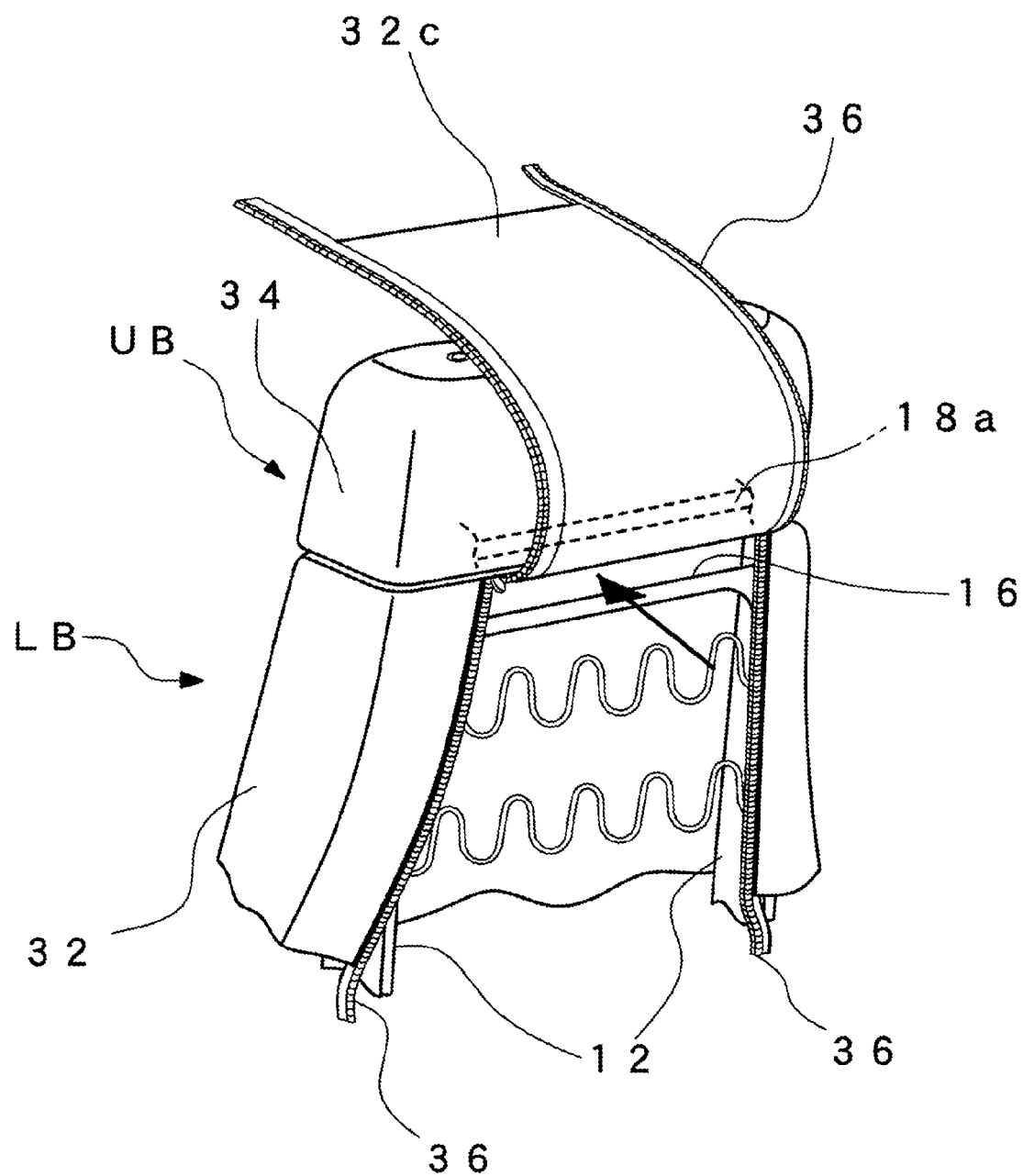
FIG. 34 is an explanatory perspective view showing the manufacture of a center-foldable seat back.
Figure 35:
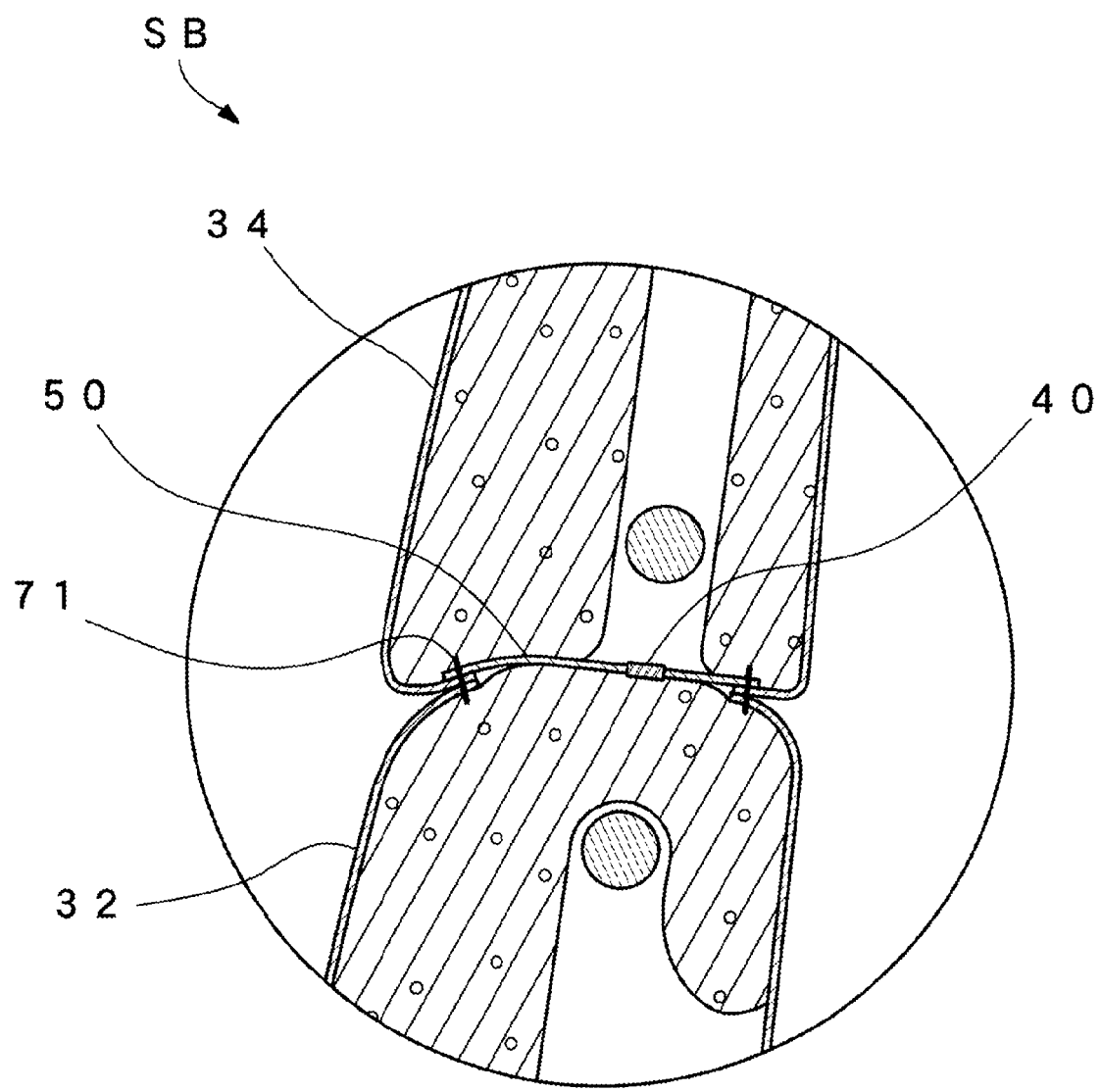
FIG. 35 is an enlarged explanatory side sectional view of a relevant portion of a center-foldable seat back.
Figure 36:
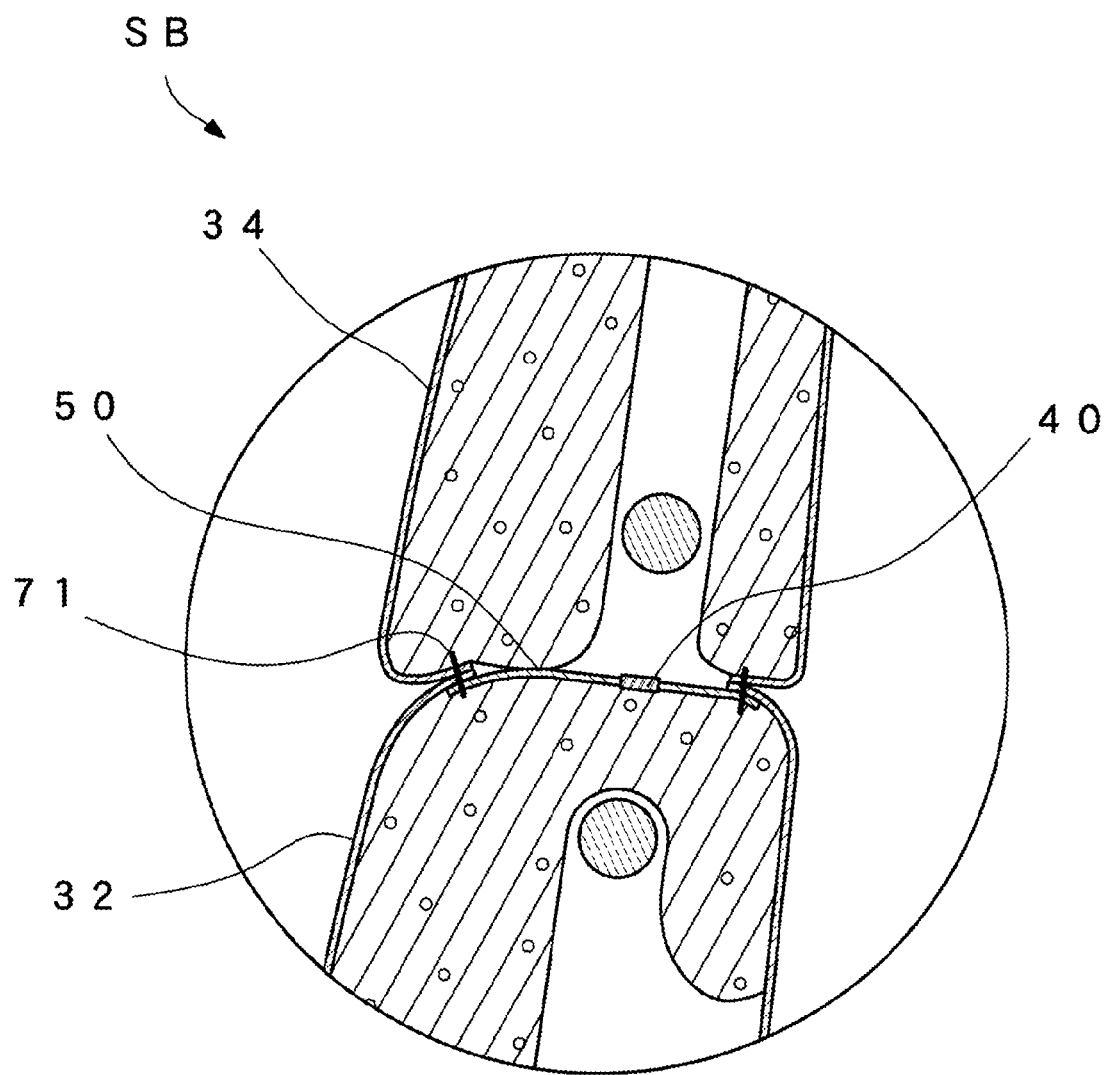
FIG. 36 is an enlarged explanatory side sectional view of a relevant portion of a center-foldable seat back.
Figure 37:
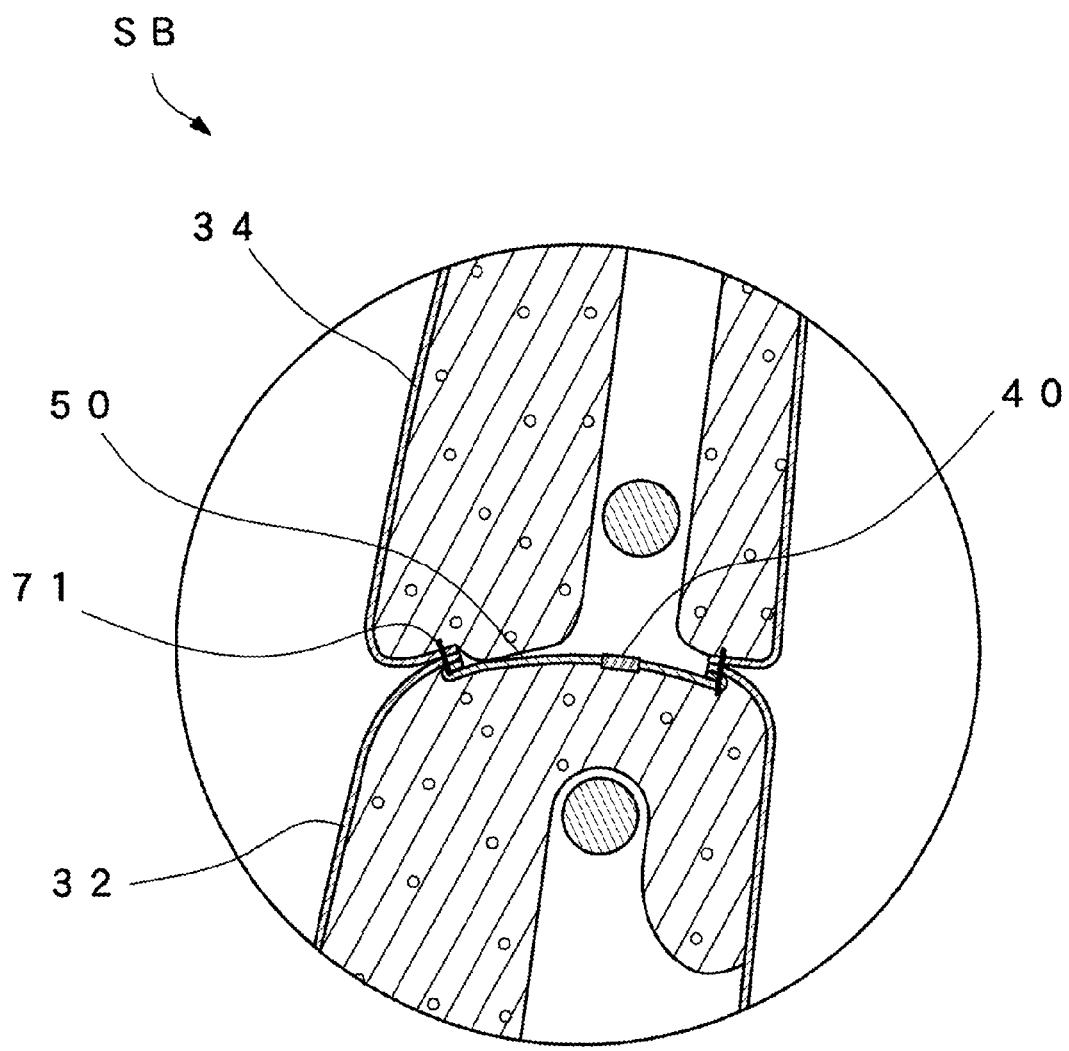
FIG. 37 is an enlarged explanatory side sectional view of a relevant portion of a center-foldable seat back.
Figure 38:
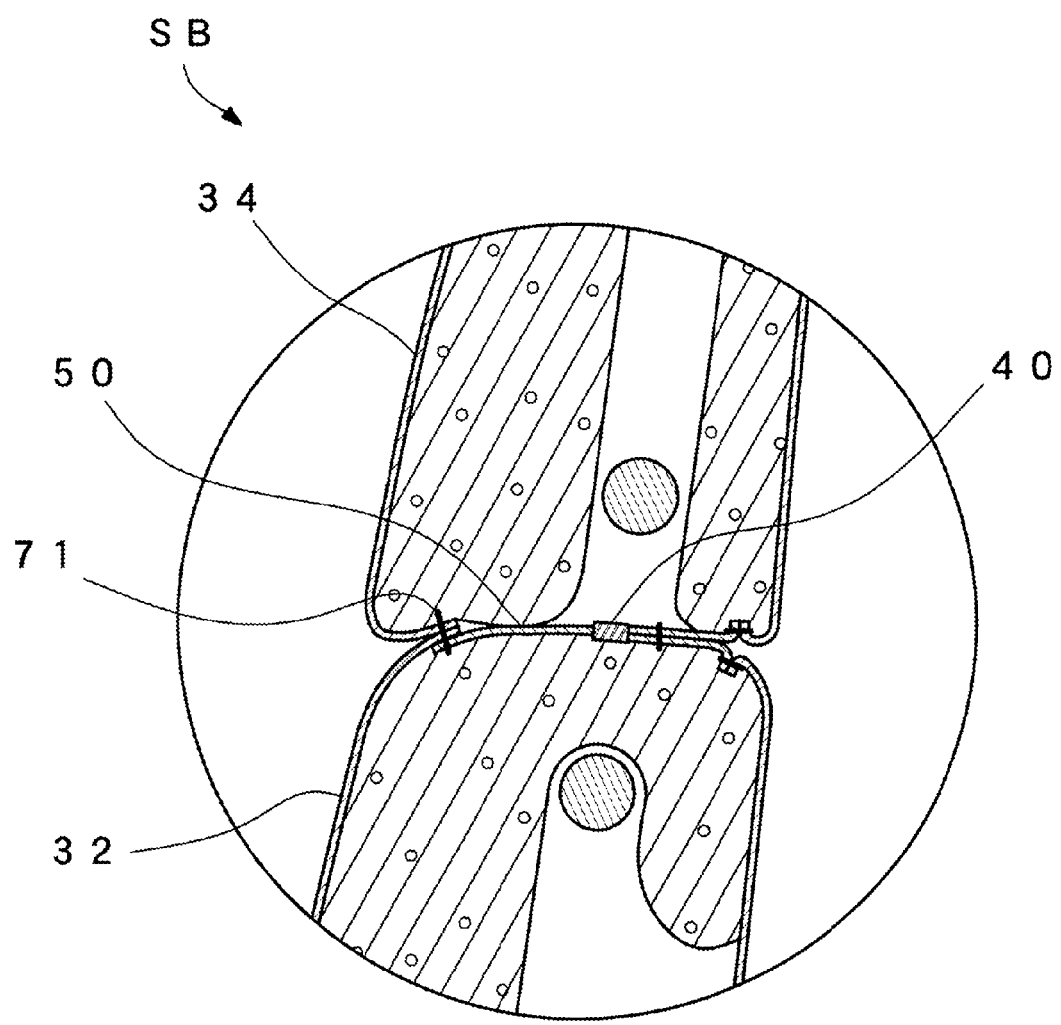
FIG. 38 is an enlarged explanatory side sectional view of a relevant portion of a center-foldable seat back.
Figure 39:
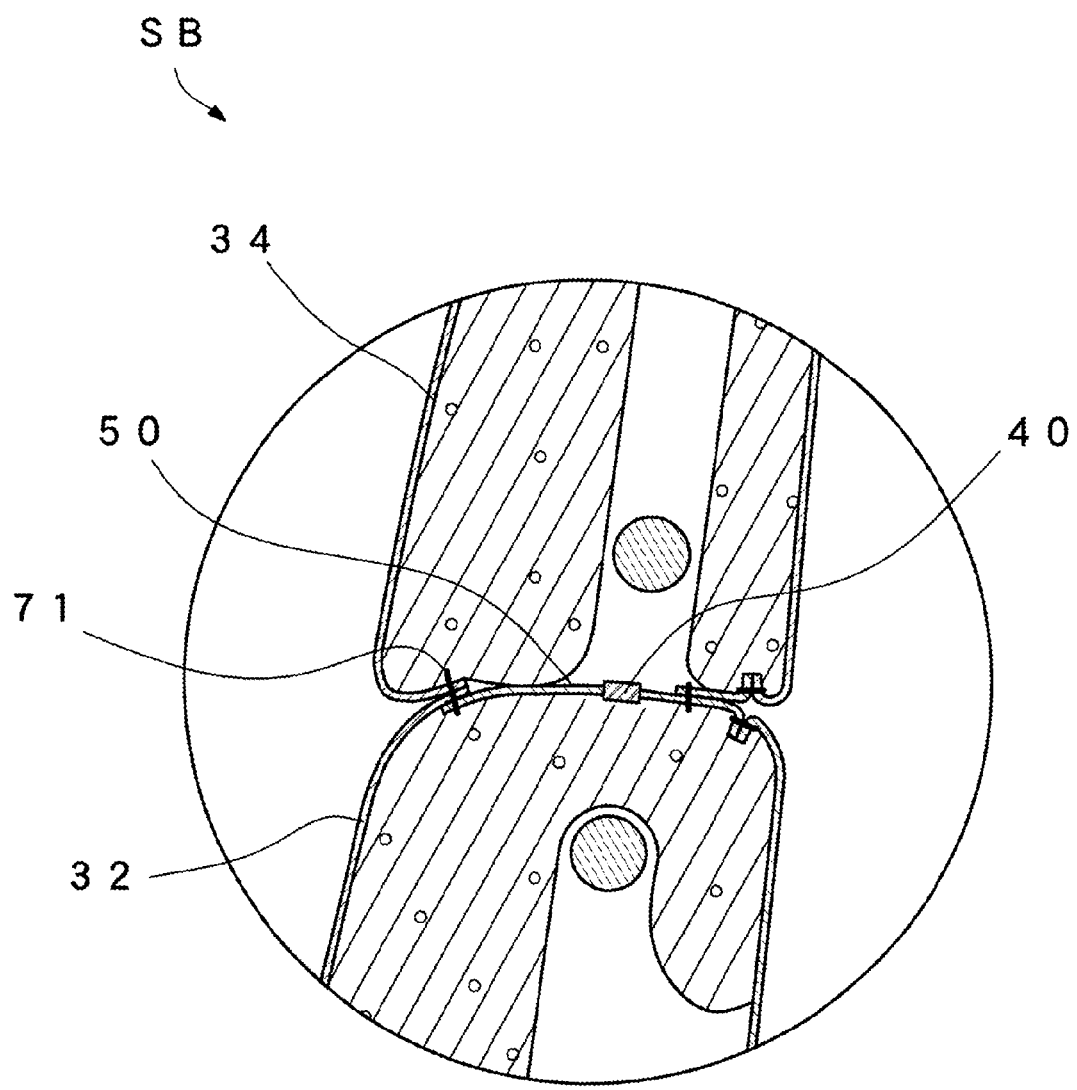
FIG. 39 is an enlarged explanatory side sectional view of a relevant portion of a center-foldable seat back.
Figure 40:
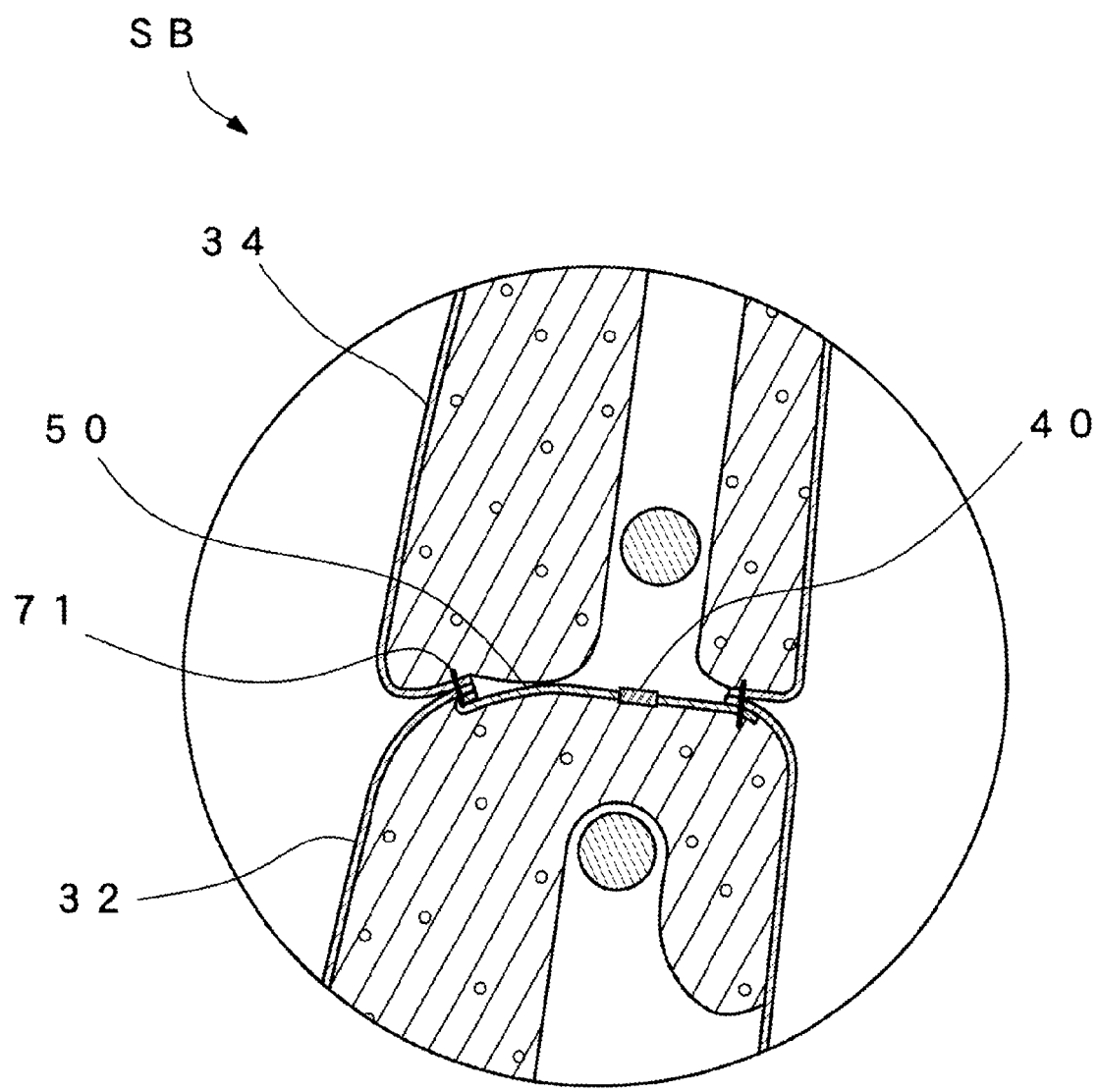
FIG. 40 is an enlarged explanatory side sectional view of a relevant portion of a center-foldable seat back.

In the seat back upper part covering step S4, the upper pad 24 is assembled to the upper frame 18 while the upper frame 18 is held in a state of being tilted in the tilting step S3, and the upper cover 34 of the trim cover 30 is put on the upper pad 24. Then, as shown in FIG. 34, the portion located between the vertical slide fasteners 36, 36 on the back surface side of the lower cover 32 is reversingly rolled up from the open side, and the connecting member 40 is held in an open state. Thereafter, all of the upper frame 18 to which the upper pad 24 is assembled is inserted into the upper cover 34.

In the closing step S5, the connecting member 40 of the trim cover 30 is closed from between the lower frame 16 and the intermediate part 18a of the upper frame 18 to close the upper cover 34.

In the seat back lower part covering step S6, after the closing step S5, the lower pad is assembled to the lower frame 16, the lower cover 32 of the trim cover 30 is rolled down, and all of the lower frame 16 to which the lower pad 22 is assembled is disposed on the inside of the lower cover 32, whereby the open side is finally closed.

According to the method of manufacturing the center-foldable seat back including the above-described steps, since the trim cover 30 is assembled in the state in which the upper frame 18 is held in a state of being tilted in the tilting step S3, the region of work for the connecting member 40 becomes large, and especially the space above the connecting member 40 is secured. Therefore, the assembly is easy to do so that the center-foldable seat back having features of the center-foldable seat back can be manufactured with high efficiency.

In the case where the seat back upper part covering step is carried out before the tilting step in the process in which the tilting step, the seat back upper part covering step, the closing step, and the seat back lower part covering step are carried out continuously after the back frame producing step and the trim cover producing step have been carried out in advance by separate processes, the steps described below are carried out. Of Steps 1 to 4, Steps 3 and 4 are carried out after Step 1 or Step 2.

Step 1: A seat back upper part covering step in which the upper pad 24 is assembled to the upper frame 18, the upper cover 34 of the trim cover 30 is put on the upper pad 24, the lower cover 32 is reversingly rolled up from the open side to hold the connecting member 40 in an open state, and all of the upper frame 18 to which the upper pad 24 is assembled is inserted into the upper cover 34.

Step 2: A tilting step in which the upper frame 18 is held in a tilted state by being tilted relative to the lower frame 16.

Step 3: A closing step in which the connecting member 40 of the trim cover 30 is closed to close the upper cover 34.

Step 4: A seat back lower part covering step in which, after the closing step, all of the lower frame 16 to which the lower pad 22 is assembled is disposed on the inside of the lower cover 32 to finally close the open side.

In the method of manufacturing the center-foldable seat back including the above-described steps as well, similarly, since the trim cover 30 is assembled in the state in which the upper frame 18 is held in a state of being tilted in the tilting step, the region of work for the connecting member 40 becomes large, so that the center-foldable seat back can be manufactured with high efficiency.

In the above-described embodiments, for the sewing of the upper cover 34, the lower cover 32, the cloth piece 50, and the like, of the trim cover 30, various sewing methods can be used. For example, as shown in FIGS. 35 to 40, any sewing method can be used, such as plural-piece sewing and two-piece sewing. Also, various sewing methods may be mixed. The sewing method can be selected considering the load applied to the sewing portion, the elongation, and the like.

TABLE OF REFERENCE CHARACTERS

| | |
|---|---|
| S | vehicle seat |
| SP | seat cushion/seat surface part |
| SB | center-foldable seat back |
| UB | seat back upper part |
| LB | seat back lower part |
| HR | headrest |
| T | rugged stripes |

-continued

TABLE OF REFERENCE CHARACTERS

| | |
|---|---|
| E | region |
| M | notch part |
| 10 | back frame |
| 12 | side frame |
| 12a | arcuate groove |
| 12b | shaft part |
| 14 | connecting frame |
| 14a | guide protrusion |
| 16 | lower frame |
| 17 | surrounding wire |
| 17a | concave part |
| 18 | upper frame |
| 18a | intermediate part |
| 18b | upper part |
| 18c | side part |
| 18d | guide |
| 19 | control cable |
| 20 | pad |
| 22 | lower pad |
| 22a | notch part |
| 22f | concave part |
| 24 | upper pad |
| 24a, 24c | extension part |
| 24d | lower end face |
| 24f | concave part |
| 30 | trim cover |
| 32 | lower cover |
| 32a | front surface side (front cover) |
| 32b | side surface side |
| 32c | back surface side |
| 32d | upper surface side |
| 32e | lower surface side |
| 33 | mounting hole |
| 34 | upper cover |
| 34a | front surface side (front cover) |
| 34b | side surface side |
| 34c | back surface side |
| 34d | upper surface side |
| 34e | lower surface side |
| 36 | vertical slide fastener |
| 38 | notch part |
| 40 | connecting member |
| 42 | first connecting part |
| 42a | front cloth tape |
| 44 | second connecting part |
| 44a | rear cloth tape |
| 50, 51, 52 | cloth piece |
| 71, 72 | seam |

The invention claimed is:

1. A seat comprising:
a center-foldable seat back in which a seat back upper part tilts forward relative to a seat back lower part, the seat back comprising:
   a back frame comprising an upper frame supporting the seat back upper part and a lower frame supporting the seat back lower part, the upper frame tiltably connected to the lower frame;
   an upper pad assembled to the upper frame and a lower pad assembled to the lower frame; and
   a trim cover for covering the upper pad and the lower pad and comprising a front cover and a rear cover;
wherein:
   the trim cover is sewn along an entire periphery at a mutual contact position of an upper cover and a lower cover, and is openable and closable by a connecting member comprising a first connecting part disposed at a front sewing seam position of the front cover and a second connecting part disposed at a rear sewing seam position of the rear cover.

2. The seat according to claim 1, wherein a cloth piece is interposed between the front sewing seam position of the upper cover and the lower cover located on a front side of the seat back of the trim cover and the first connecting part or between the rear sewing seam position of the upper cover and the lower cover located on a rear side of the seat back and the second connecting part.

3. The seat according to claim 2, wherein the cloth piece is disposed in a central portion on an inside of the trim cover.

4. The seat according to claim 1, wherein the connecting member is any one of a slide fastener, a Delrin fastener, an open slide fastener, a snap faster, and a hook-and-eye.

5. The seat according to claim 1, wherein:
the connecting member is selected from the group consisting of a slide fastener, a Delrin fastener, and an open slide fastener; and
the connecting member comprises only a single fastening portion of the selected fastener.

6. The seat according to claim 1, wherein the connecting member is attached so that a center thereof is located on a back surface side of a vertical line connecting the upper frame to the lower frame.

7. The seat according to claim 1, wherein assembling is performed so that a vertical extension line of one frame of the upper frame and the lower frame, a vertical extension of a central portion of the connecting member, and a vertical extension line of the other frame of the upper frame and the lower frame do not coincide with each other.

8. The seat according to claim 1, wherein a contact preventing element is provided between the upper and lower frames and the connecting member.

9. The seat according to claim 1, wherein a rotation axis of the upper frame supporting the seat back upper part is arranged below the lower frame supporting the seat back lower part, and the seat back upper part is tiltable forward relative to the seat back lower part.

10. The seat according to claim 1, wherein the first connecting part and the second connecting part are arranged at a position in front of the back frame.

11. The seat according to claim 1, wherein the connecting member is provided in a location in which the upper pad and the lower pad are not present.

12. The seat according to claim 1, wherein a contact preventing element is provided between the upper and lower frames and the connecting member.

13. The seat according to claim 1, wherein two assembly connecting members extending in an up and down direction are formed on a back surface of the seat back, and a width of the assembly connecting members is wider than a width of an inner end part of the lower pad.

14. A method of manufacturing a center-foldable seat back in which a seat back upper part tilts forward relative to a seat back lower part, comprising:
in a seat back upper part covering step:
assembling an upper pad to an upper frame;
putting an upper cover of a trim cover on the upper pad;
reversingly rolling up a lower cover of the trim cover up from an open side that is not sewn with the upper cover to hold a connecting member in an open state, the connecting member being provided at a portion between the upper cover and the lower cover of the trim cover and being openable and closeable; and
inserting all of the upper frame to which the upper pad is assembled into the upper cover;
holding, in a tilting step, the upper frame in a tilted state by being tilted relative to the lower frame;
the method further comprising, subsequent to the above steps:
closing, in a closing step, the connecting member of the trim cover to close the upper cover; and
disposing, in a seat back lower part covering step, after the closing step, all of the lower frame to which a lower pad is assembled on an inside of the lower cover and then closing the open side.

15. A method of manufacturing a center-foldable seat back in which a seat back upper part tilts forward relative to a seat back lower part, comprising:
producing, in a back frame producing step, a back frame, which has an upper frame supporting the seat back upper part and a lower frame supporting the seat back lower part so that the upper frame is tiltably connected to the lower frame;
in a trim cover producing step:
sewing together an upper cover of the trim cover and a lower cover of the trim cover along an entire periphery at a mutual contact position;
disposing a first connecting part at a sewing position of a front cover; and
disposing a second connecting part at a sewing position of a rear cover, thereby producing the trim cover to which a connecting member is attached;
holding, in a tilting step, the upper frame produced in the back frame producing step in a tilted state by being tilted relative to the lower frame;
in a seat back upper part covering step:
assembling an upper pad to the upper frame while the upper frame is held in a state of being tilted in the tilting step;
putting the upper cover of the trim cover on the upper pad;
then, reversingly rolling up the lower cover of the trim cover from an open side that is not sewn with the upper cover;
holding the connecting member of the trim cover in an open state; and
thereafter, inserting all of the upper frame to which the upper pad is assembled into the upper cover;
closing, in a closing step, the connecting member of the trim cover to close the upper cover; and
after the closing step, in a seat back lower part covering step:
assembling a lower pad to the lower frame;
rolling down the lower cover of the trim cover; and
disposing all of the lower frame to which the lower pad is assembled on the inside of the lower cover, and then closing the open side.

* * * * *